United States Patent
Patsiokas et al.

(10) Patent No.: US 10,567,471 B2
(45) Date of Patent: Feb. 18, 2020

(54) SYSTEMS AND METHODS FOR COST EFFECTIVE DISTRIBUTION OF FILES TO USER DEVICES USING COMBINATION OF BROADCAST AND TWO-WAY COMMUNICATION PATHS

(71) Applicant: Sirius XM Radio Inc., New York, NY (US)

(72) Inventors: Stelios J. Patsiokas, Coral Springs, FL (US); Richard A. Michalski, Coral Springs, FL (US); Paul D. Marko, Pembroke Pines, FL (US); Mark Rindsberg, Boca Raton, FL (US); Stuart Cox, Boca Raton, FL (US); David G. Mantel, Boynton Beach, FL (US)

(73) Assignee: Sirius XM Radio Inc., New York, NY (US)

( * ) Notice: Subject to any disclaimer, the term of this patent is extended or adjusted under 35 U.S.C. 154(b) by 473 days.

(21) Appl. No.: 14/438,147

(22) PCT Filed: Oct. 25, 2013

(86) PCT No.: PCT/US2013/066882
§ 371 (c)(1),
(2) Date: Apr. 23, 2015

(87) PCT Pub. No.: WO2014/066803
PCT Pub. Date: May 1, 2014

(65) Prior Publication Data
US 2015/0271247 A1    Sep. 24, 2015

Related U.S. Application Data

(60) Provisional application No. 61/719,223, filed on Oct. 26, 2012.

(51) Int. Cl.
*H04L 29/08* (2006.01)
*H04W 4/70* (2018.01)

(52) U.S. Cl.
CPC ............... *H04L 67/06* (2013.01); *H04W 4/70* (2018.02)

(58) Field of Classification Search
CPC ..... H04L 67/06; H04L 69/14; H04L 12/1836; H04W 4/005
(Continued)

(56) References Cited

U.S. PATENT DOCUMENTS 5,532,939 A * 7/1996 Psinakis .............. H04L 12/5692
709/226
5,727,002 A * 3/1998 Miller .................. H04L 1/1614
709/237

(Continued)

FOREIGN PATENT DOCUMENTS

EP    0 695 075 B1    6/2003
EP    1 871 031 A2    12/2007

OTHER PUBLICATIONS

ETSI Technical Specification entitled "Universal Mobile Telecommunications System (UMTS); LTE; Multimedia Broadcast/Multicast Service (MBMS); Protocols and codecs"; 3GPP TS 23.346 version 11.5.0 Release 11; Section 9 Associated Delivery Procedures; pp. 1-9 and 81-99; www.etsi.org (Jul. 2013).

(Continued)

*Primary Examiner* — Jerry B Dennison
(74) *Attorney, Agent, or Firm* — Kramer Levin Naftalis & Frankel LLP

(57) ABSTRACT

Hybrid file delivery systems and methods divide one or more files into parts for transmission to plural user devices during a first transmission phase employing one or more one-to-many communication paths (e.g., broadcast or mul- (Continued)

ticast), and then transmit missing file parts to designated user devices during a second transmission phase employing respective one-to-one communication paths. User devices are configured with specified criteria for when and how to report file delivery status to a file delivery center that maintains a database of target user devices, file delivery campaigns, and statuses of file delivery completion at the user devices. The file delivery center can employ the database information to determine cost benefit for delivery of a file using two different transmission modalities and control when to switchover to or commence the second transmission phase after the first transmission phase.

20 Claims, 25 Drawing Sheets

(58) Field of Classification Search
USPC .................................................... 709/217
See application file for complete search history.

(56) References Cited

U.S. PATENT DOCUMENTS

| | | | | |
|---|---|---|---|---|
| 5,734,981 | A * | 3/1998 | Kennedy, III | G07C 5/008 455/445 |
| 6,055,426 | A * | 4/2000 | Beasley | H04W 60/06 455/427 |
| 6,868,270 | B2 * | 3/2005 | Dent | H04B 7/18545 455/435.1 |
| 7,190,956 | B2 * | 3/2007 | Dorenbosch | H04L 51/04 455/435.1 |
| 7,277,717 | B1 * | 10/2007 | Hart | G06Q 10/107 455/466 |
| 7,373,144 | B1 * | 5/2008 | Kirkpatrick | H04L 51/14 455/421 |
| 7,596,366 | B2 * | 9/2009 | Van Bosch | H04W 52/0216 455/343.2 |
| 7,801,539 | B2 * | 9/2010 | Murtagh | H04W 4/14 455/414.1 |
| 7,849,149 | B2 * | 12/2010 | Habaguchi | H04L 12/1881 709/207 |
| 7,971,227 | B1 * | 6/2011 | Marko | H04H 20/426 370/394 |
| 8,045,963 | B2 * | 10/2011 | Sakaguchi | H04M 3/53383 455/412.1 |
| 8,055,255 | B2 * | 11/2011 | Inoue | H04L 12/18 455/426.1 |
| 8,160,656 | B2 * | 4/2012 | Van Bosch | H04B 7/18563 340/870.07 |
| 8,165,611 | B2 * | 4/2012 | Patterson | H04L 51/38 370/312 |
| 8,452,328 | B2 * | 5/2013 | Marko | H04H 40/90 455/13.2 |
| 8,478,520 | B2 * | 7/2013 | Schalk | G01C 21/3608 340/995.12 |
| 9,544,162 | B2 * | 1/2017 | Vasseur | H04L 12/1895 |
| 2002/0046292 | A1 * | 4/2002 | Tennison | H04L 12/5692 709/238 |
| 2004/0034712 | A1 * | 2/2004 | Rajwan | H04L 1/0002 709/231 |
| 2004/0068721 | A1 * | 4/2004 | O'Neill | G06F 8/65 717/168 |
| 2005/0157693 | A1 * | 7/2005 | Lopez | H04B 7/18595 370/342 |
| 2005/0187968 | A1 * | 8/2005 | Dunning | G06Q 30/02 |
| 2005/0249139 | A1 * | 11/2005 | Nesbit | H04H 20/08 370/312 |
| 2006/0240811 | A1 * | 10/2006 | De Luca | H04W 8/18 455/414.3 |
| 2007/0093943 | A1 * | 4/2007 | Nelson | B60R 25/2018 701/2 |
| 2007/0291646 | A1 * | 12/2007 | Ohishi | H04L 1/1678 370/236 |
| 2008/0287092 | A1 * | 11/2008 | Rindsberg | H04H 20/57 455/344 |
| 2009/0285155 | A1 * | 11/2009 | Scarpa | H04L 27/0008 370/326 |
| 2010/0098077 | A1 * | 4/2010 | Oertel | H04L 12/1854 370/390 |
| 2010/0106514 | A1 * | 4/2010 | Cox | G01C 21/20 705/1.1 |
| 2010/0177701 | A1 * | 7/2010 | Maheshwari | H04L 1/1685 370/328 |
| 2010/0317365 | A1 * | 12/2010 | Stumphauzer, II | G01C 21/26 455/456.1 |
| 2011/0028128 | A1 * | 2/2011 | Cazanas | H04N 7/17327 455/414.1 |
| 2011/0201329 | A1 * | 8/2011 | Carter | H04L 51/26 455/432.1 |
| 2011/0307929 | A1 * | 12/2011 | Youssefmir | H04N 21/23106 725/89 |
| 2012/0078703 | A1 * | 3/2012 | Berger | G06Q 30/0207 705/14.27 |
| 2012/0207075 | A1 * | 8/2012 | Nagaraj | H04H 20/42 370/312 |
| 2012/0259994 | A1 * | 10/2012 | Gillies | H04L 12/1881 709/231 |
| 2013/0226369 | A1 * | 8/2013 | Yorio | G06F 17/00 701/1 |
| 2014/0282016 | A1 * | 9/2014 | Hosier, Jr. | H04W 4/08 715/733 |
| 2015/0271247 | A1 * | 9/2015 | Patsiokas | H04W 4/70 709/217 |

OTHER PUBLICATIONS

Elias, P., Coding for Two Noisy Channels, in *Information Theory* (Colin Cherry, ed.), Academic Press, New York, pp. 61-74 (1956).

* cited by examiner

Campaign Definition

Campaign Name

SUMS-00348 - Demonstration Campaign

Select Target Vehicles

Select which vehicles will be updated in this campaign.

Select Update Components

Select which Components will be updated.

Specify Schedule

Select when updates will be deployed.

Campaign Details:
SUMS-00348 - Demonstration Campaign

Done

FIG. 17

Select Target Vehicles

By VIN Range
Select vehicles within a range of VINs.

By VIN List
Select vehicles with a list of VINs.

By Software Component
Select vehicles by specific software component.

| Manufacturer ID | Vehicle Descriptor | Check Digit | Model Year | Plant Code | Production Seq Num |
|---|---|---|---|---|---|
| | | | | | |

Done

FIG. 18

| VINInput | | |
|---|---|---|
| Manufacturer ID | | 1A2 ▼ |
| Vehicle Descriptor | | 4?6?? |
| Model Year | | C |
| Plant Code | | ANY |
| Production Range (First) | | ANY |
| Production Range (Last) | | |

Done

FIG. 19

Select Target Vehicles

By VIN Range
Select vehicles within a range of VINs.

By VIN List
Select vehicles with a list of VINs.

By Software Component
Select vehicles by specific software component.

| Manufacturer ID | Vehicle Descriptor | Check Digit | Model Year | Plant Code | Production Seq Num |
|---|---|---|---|---|---|
| 1A2 | 43633 | 6 | C | U | 228390 |
| 1A2 | 48688 | 7 | C | U | 228391 |
| 1A2 | 41611 | 7 | C | U | 228392 |
| 1A2 | 44644 | 3 | C | U | 228393 |
| 1A2 | 46666 | 7 | C | U | 228394 |
| 1A2 | 48688 | 2 | C | U | 228395 |
| 1A2 | 42622 | 5 | C | U | 228396 |
| 1A2 | 48688 | 6 | C | U | 228397 |

48755 Selected VINs

Done

Campaign Definition

Campaign Name

SUMS-00348 - Demonstration Campaign

Select Target Vehicles

Select which vehicles will be updated in this campaign.

Select Update Components

Select which components will be updated.

Specify Schedule

Select when updates will be deployed.

Campaign Details:
SUMS-00348 - Demonstration Campaign
48755 Selected VINs
- IVI-H v02.37.9385 (+ Fuel Prices)
- CSU 01.12.A
- TCM v01.02.121205
[Sat: Manual (Normal) / Cell: Manual (Normal)]

Done

FIG. 22

SYSTEMS AND METHODS FOR COST EFFECTIVE DISTRIBUTION OF FILES TO USER DEVICES USING COMBINATION OF BROADCAST AND TWO-WAY COMMUNICATION PATHS

BACKGROUND OF THE INVENTION

Bandwidth in content delivery and/or communications systems is typically limited and valuable. Further, the transmission method used in some of these systems (e.g., 4G or LTE cellular communications) is significantly more expensive than other transmission methods (e.g., WiFi, satellite or terrestrial broadcast), depending on the size of the content (e.g., bits) and the number of users who are receiving the content. Thus, efficient use of transmission bandwidth and consideration of cost effectiveness of different transmission modalities is desirable when delivering content to users' cellular phones, smartphones, telematics-enabled vehicles, portable computers, and other devices.

Software updates and other downloads to user devices are preferably performed over WiFi or other internet connection, since updates over a wireless network (e.g., 3G, 4G, etc.) are often subject to charges by the amount of bandwidth used, and the number of devices which must be provided with the update. Mobile devices, however, are not always able to be in WiFi range for updates.

Broadcast communication channels can provide a cost effective path for distributing the same information to a large geographically distributed population of mobile devices; however, a method relying only on broadcast communications does not provide assurance that all (or a sufficient number) of the mobile devices have received the update, and this assurance is necessary for many business applications.

A need therefore exists for a cost effective method of delivering software updates and other files to user devices, and particularly to mobile user devices that may not be in range for WiFi or other inexpensive internet connection. A need also exists for transmission method choices for delivering other data or messages to user devices depending on the number of users, the urgency of file or message delivery, and time constraints.

SUMMARY OF THE INVENTION

In accordance with aspects of illustrative embodiments of the present invention, when a file (or plural files) is to be delivered to a large number of user devices, the largest portion of the file delivery process is performed via broadcast transmission, which is exemplified below as Phase 1. The file (or files) is processed to be delivered to user devices in parts that are reconstructed into the complete file (or complete set of update files) at the user devices (e.g., the user device receives all or enough of the file parts to reconstruct and use the file for its intended purpose). For user devices that fail to receive a complete file after commencement of Phase 1, remaining file parts for that user device(s) can be later streamed or otherwise transmitted via a 2-way transmission path which is exemplified below as Phase 2 and/or Phase 3. Thus, the user device(s) each can consume a comparatively small amount of cellular or other subscription service minutes to obtain the complete file since most of the file data was delivered by a broadcast to many user devices. The smartphone or internet device or other user device is configured (e.g., via an App) to monitor and combine the file parts received via broadcast and/or 2-way communications.

In accordance with other aspects of illustrative embodiments of the present invention, a hybrid file delivery system transmits one or more files to target user devices via at least two methods (e.g., Phase 1 and Phase 2), and the target user devices are configured to transmit responses to the hybrid file delivery system indicating a status of file delivery completion. Different criteria for the hybrid file delivery system commencing Phase 2 or Phase 3 after Phase 1 can be specified (e.g., on a per file basis, on a file sender basis, and so on). Further, different criteria for the target user devices to send responses to the hybrid file delivery system can be specified. For example, for critical updates that must be distributed to all mobile devices to ensure their continued operation, devices can be requested to provide completion status on a regular schedule or at specified completion percentages. On the other hand, for updates which only some (possibly small) fraction of mobile devices may actually need, the devices could be requested to only provide completion status if the update was required and completion needed to take place right away.

The hybrid file delivery system maintains a database relating to the files sent and the responses received from the target user devices to facilitate determining when to commence a different phase of file transmission. The target user devices store files, file parts and are programmed to monitor the received and stored file parts to determine when to send a response to the hybrid file delivery system (e.g., based on specified criteria for responses). The target user devices can be programmed based on, for example, messages or metadata from an update center that specify criteria for when to send the responses (e.g., at certain time intervals or percentages of file update completion). These criteria can vary depending on the file, the file sender, the urgency of the update, among other parameters. Thus, the hybrid file delivery system can have dynamic feedback relating to the progress of delivering a file to the target users to facilitate selection of the most cost effective transmission methods available within the time and budget constraints of the file sender.

In accordance with illustrative, alternative embodiments of the present invention, Phase 1 of a file delivery can employ user device downloads from devices on inexpensive local networks (e.g. WiFi), followed by a Phase 2 broadcast transmission to user devices based on selected criteria.

In accordance with illustrative, alternative embodiments of the present invention, the hybrid delivery system is used for improved delivery of messages.

BRIEF DESCRIPTION OF THE DRAWINGS

The various objects, advantages and novel features of illustrative embodiments of the present invention will be more readily appreciated from the following detailed description when read in conjunction with the appended drawings, in which:

FIG. 17 shows a display indicative of a campaign definition screen in a software update management system in accordance with an illustrative embodiment of the present invention;

FIG. 18 shows a display indicative of a target user device selection screen in a software update management system in accordance with an illustrative embodiment of the present invention;

FIG. 19 shows a display indicative of a user devices identification input screen in a software update management system in accordance with an illustrative embodiment of the present invention;

FIG. 20 shows a display indicative of a populated target user devices listing screen in a software update management system in accordance with an illustrative embodiment of the present invention;

FIG. 21 shows a display indicative of a file update delivery schedule screen in a software update management system in accordance with an illustrative embodiment of the present invention;

FIG. 22 shows a display indicative of a populated campaign definition screen in a software update management system in accordance with an illustrative embodiment of the present invention;

Throughout the drawing figures, like reference numbers can be understood to refer to like elements, features and structures.

DETAILED DESCRIPTION OF ILLUSTRATIVE EMBODIMENTS

Figure 1:
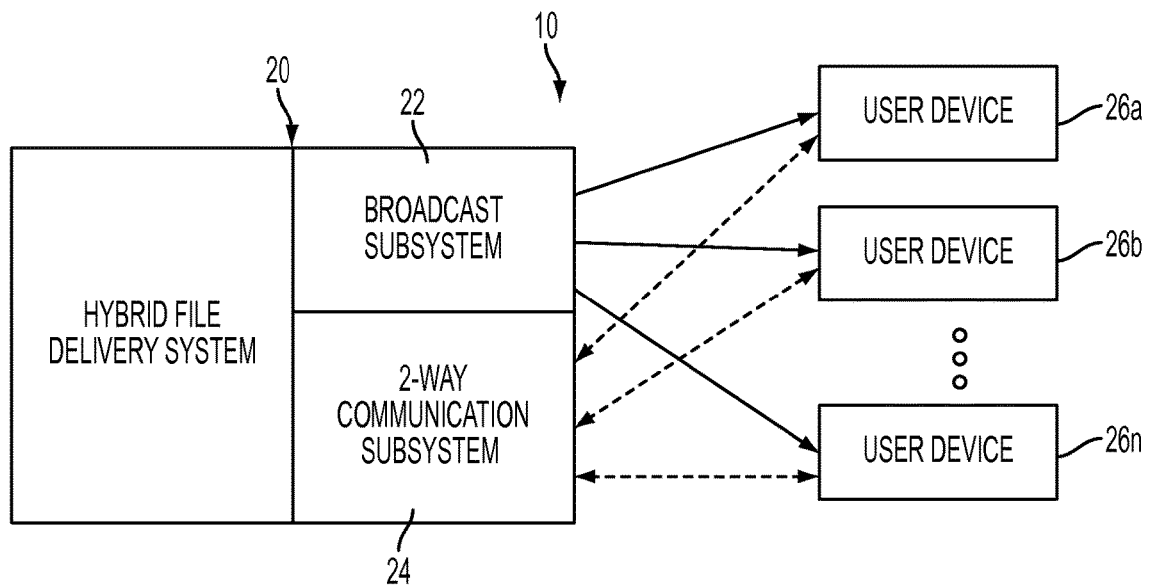
FIG. 1 shows a block diagram of a system for file transmission constructed in accordance with an illustrative embodiment of the present invention.

In accordance with illustrative embodiments of the present invention, a system 10 and methods are provided to transmit a file or the same set of files 12 to many users, as depicted in FIG. 1. As will be explained below, the file can be relatively large, and the users can be located across a relatively large geographic area (e.g., a geographic area that extends beyond the premises of a building or a local area network). The system can also be used to deliver other data such as messages. The system 10 can maximize cost benefit for delivery of the file or set of files 12 by determining to what extent each of at least two different transmission modalities or phases is used based on the monitoring of file delivery completion status at the users' devices 26.

As shown in FIG. 1 and in accordance with illustrative embodiments of the present invention, the system 10 can comprise a hybrid file delivery system 20 in communication with a plurality of user devices 26. The hybrid file delivery system 20 can be implemented using a server, for example, and can comprise a broadcast subsystem 22 and a 2-way communications subsystem 24 for communicating with the user devices 26, for example. The broadcast subsystem 22 can be an interface to the infrastructure of one or more broadcast systems (not shown), to provide the file(s) to be broadcast and parameters for sending the file(s) such as start and end dates of a particular file update campaign, schedules (e.g., dates, times or other criteria) for initial transmission and retransmissions (if any), and optional control data (e.g., in-band or out of band metadata or messaging for target user devices). The 2-way communications subsystem 24 can be an interface to the infrastructure of one or more 2-way communications systems (not shown), to initiate and receive calls from target user devices, for example, to send file(s) or parts of files, to send control data (e.g., via metadata or messages) or instructions for obtaining the control data (e.g., by downloading control data) to program or otherwise configure a user device with specifications on when to send acknowledgements or other responses regarding missing file parts or status of completion of a file update, and to receive the responses.

Figure 2:
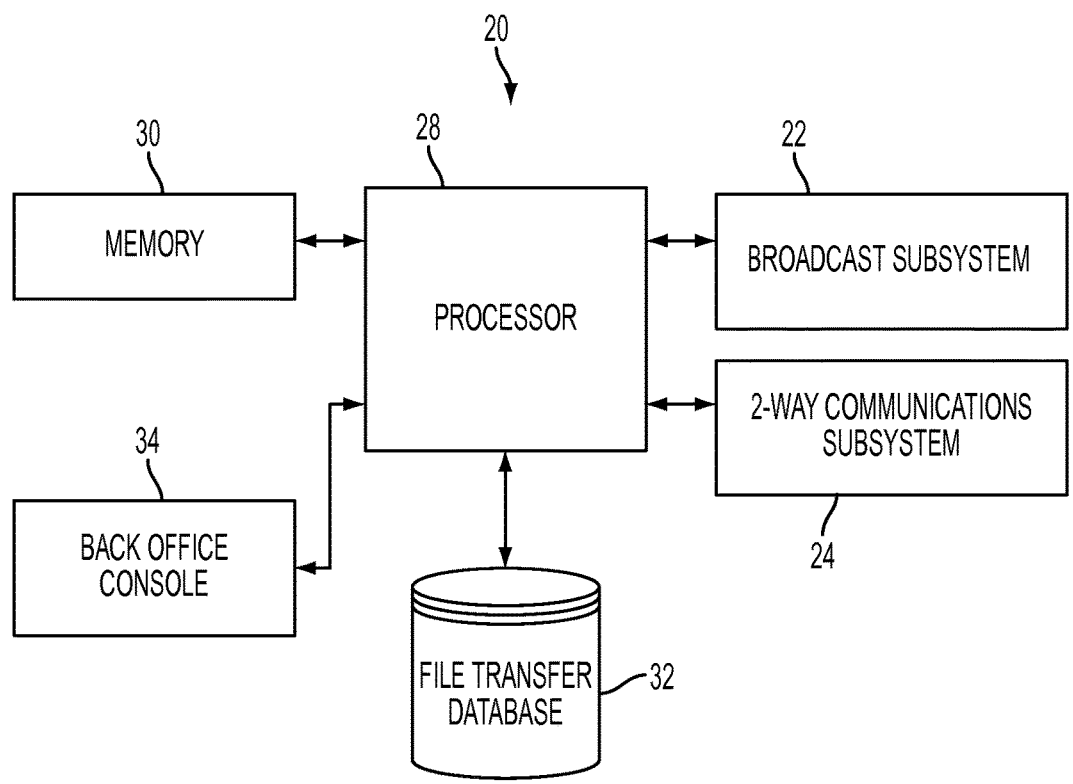
FIG. 2 shows a block diagram of a hybrid file delivery system constructed in accordance with an illustrative embodiment of the present invention.

As shown in FIG. 2, the hybrid file delivery system 20 can also comprise or otherwise have access to a database 32 for storing file delivery information. The system 20 can, for example, store information in the database 32 relating to responses received from the user devices 26 targeted to receive a selected file 12 such as a file identifier, a recipient or user device identifier for each target user and/or user device, a status of file delivery completion per target user and/or user device, and file delivery specifications such as criteria for designating when target user devices are to report file delivery completion status and criteria for designating when to commence, or switchover to, a second type of transmission phase or modality (e.g., Phase 2 or Phase 3) after commencement of a first transmission phase of modality (e.g., Phase 1). An operator interface 34 (e.g., a back office (BO) console) is provided which has a display, a keypad, mouse or other user input device, and computer-generated screens to facilitate setup of a file or message delivery operation or campaign including, for example, specifying criteria for desired reporting of file delivery status by users and for transmission modality switchover. FIGS. 16-26 below provide illustrative BO console 34 screen shots for setting up an illustrative file update or delivery campaign and monitoring the statuses delivery as reported by respective target user devices 26. Operations of the hybrid file delivery system 20 in accordance with illustrative embodiments of the present invention can be controlled by a programmable processor 28, for example, based on program code stored in a memory 30 which can be separate from or part of the database 32. Illustrative processor 28 operations are described below with reference to FIG. 11.

The manner in which the system 10 can maximize cost benefit for delivery of a file 12 using two different transmission methods will now be described with reference to the examples in FIGS. 3, 4 and 5. The hybrid file delivery system 20 is exemplified in FIGS. 3, 4 and 5 by an update center 20, that is, a center from which files 12 can be sent to user devices 26 to update their software or other files. The hybrid file delivery system 20 can, however, be used by various parties to send various types of files or data (e.g., messages) to target user devices. Further, the hybrid file delivery system 20 can comprise more than one update center or file delivery center.

Figure 3:
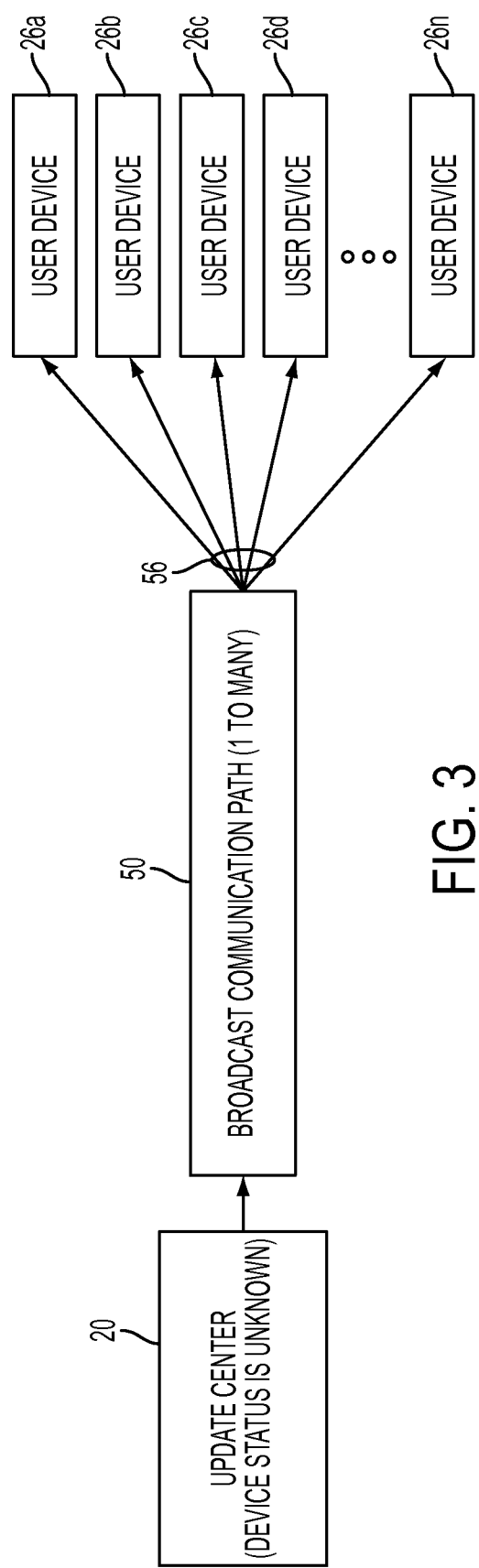
FIG. 3 shows a method for file transmission employing a 1-to-many communication path in accordance with an illustrative embodiment of the present invention.

In FIG. 3, the hybrid file delivery system 20 only employs a 1-to-many communication path 50 (e.g., broadcast/multicast) to send a file to plural user devices 26. In this case, the transmission costs are generally a function of bandwidth only and are independent of how many devices 26 receive the broadcast. Transmitting a file update, for example, to user devices 26 over a broadcast path 50 allows for low transmission costs. Without a return link, however, the file update may need to be transmitted for a long time and/or use a lot of bandwidth, and there is still a probability that some user devices 26 will not receive the file update. In addition, the update center 20 may have no way of knowing which user devices 26 have been updated and which user devices 26 have not been updated, making additional updates difficult to design and test.

Figure 4:
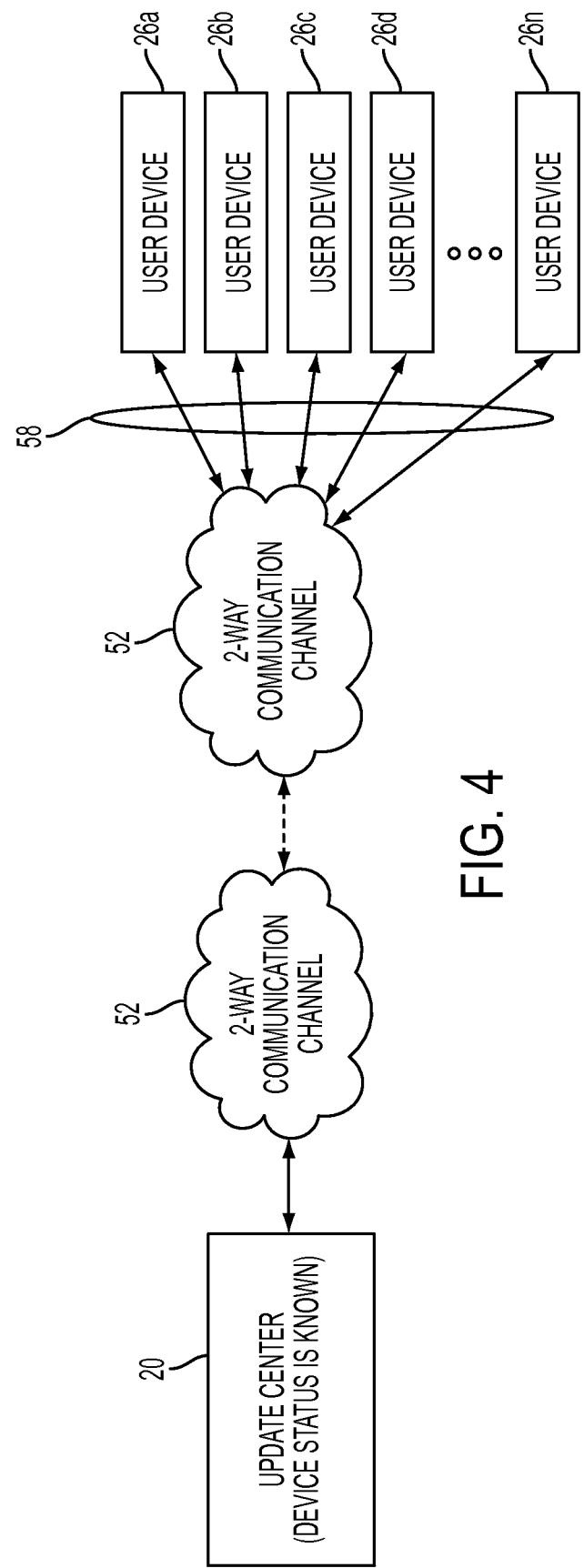
FIG. 4 shows a method for file transmission employing a 2-way communication path in accordance with an illustrative embodiment of the present invention.

In FIG. 4, the hybrid file delivery system 20 only employs a 2-way communication path 52 to send a file to plural user devices 26 on respective point-to-point channels. In this case, the transmission costs are a function of the size of the file update (e.g., bits), data rate, and the number of user devices 26. Transmitting a file update over a 2-way transmission path 52 allows for the user devices 26 to acknowledge reception of the file update. Each user device 26, however, is contacted independently (or may need to independently contact the update center 20). Thus, transmission costs for the file update can be quite high, particularly where the file update is a relatively large size, and even if the file is sent only once to each user device 26.

In accordance with an aspect of the present invention, the hybrid file delivery system 20, and the user devices 26 that receive files from the hybrid file delivery system 20, are configured to operate in accordance with a hybrid file delivery approach that allows the majority of file or a set of files 12 to be transmitted over a broadcast communication path 50 (or paths) and that minimizes the amount of the file and the number of user devices that receive the file or parts thereof over a different and likely more costly path (e.g., a 2-way communication path 52). As illustrated in FIG. 5, many of the user devices 26 will receive the complete file or set of files over the relatively low-cost broadcast path 50. Other user devices 26 will receive at least some portion of the file or files in a set transmitted over the broadcast path(s), while user devices may receive zero portion of the file transmitted via broadcast. To facilitate the delivery of the file to the user devices 26, the file 12 can be processed and divided into a number of file pieces 14 (described below) that are initially broadcast to all of the target user devices 26. In this way, partial file updates (e.g., specific missing file pieces) can be sent to some of the user devices 26 (e.g., via the 2-way path 52) to augment the content that is received via the broadcast path 50. Thus, the total amount of data (e.g., the size of update files and the number of user devices that must receive the remaining portions of the file) transmitted via a costlier path than the broadcast path 50 is greatly reduced. In addition, acknowledgements or other responses (e.g., relatively small messages sent to the update center 20) can be sent from the user devices 26 to the hybrid file delivery system 20 via a 2-way communications channel in the path 52 to facilitate a determination of which file pieces need to be sent to which of the user devices via a 2-way communications channel.

Figure 6:
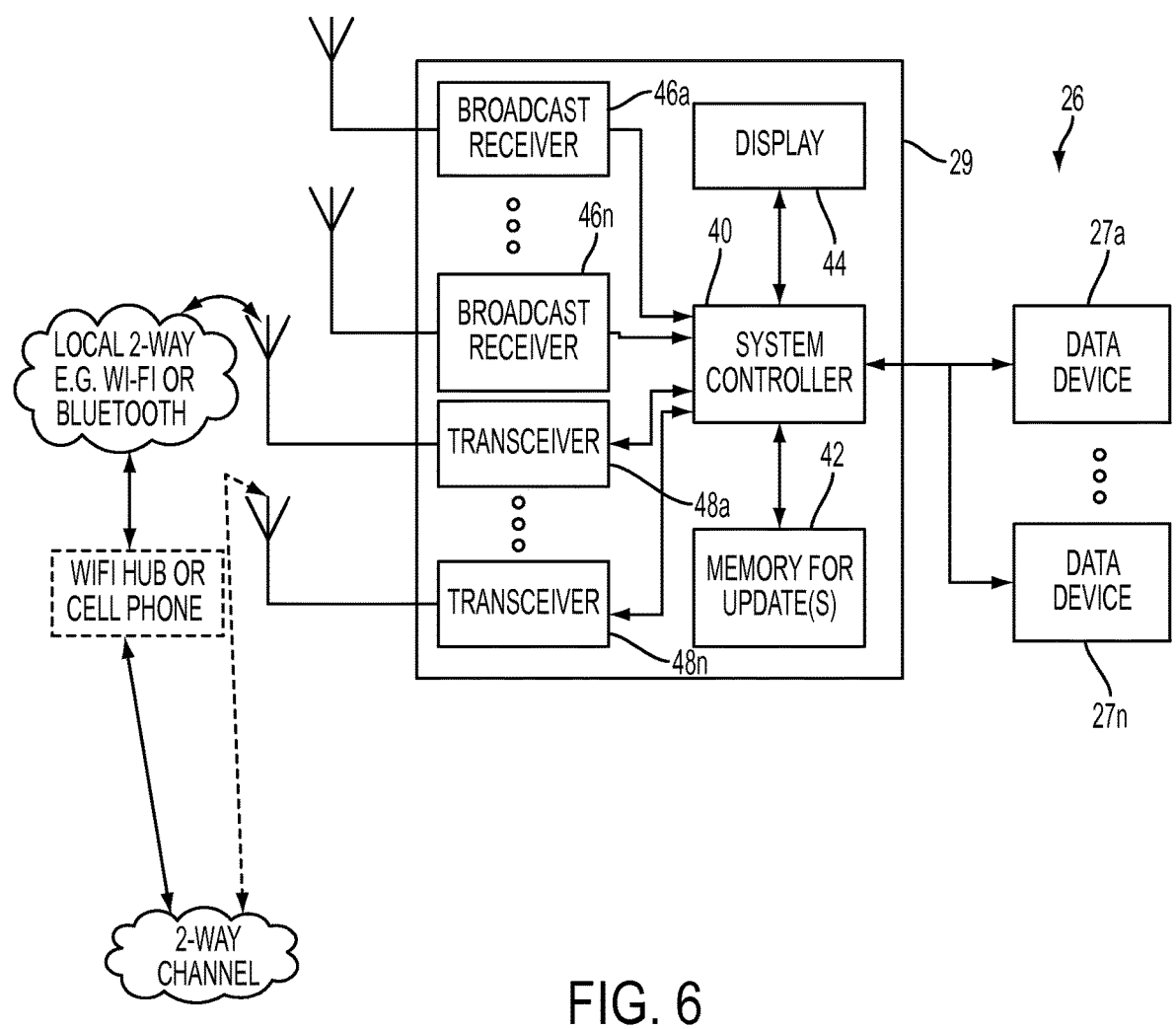
FIG. 6 shows a block diagram of a user device for receiving files, constructed in accordance with an illustrative embodiment of the present invention.

A user device 26 constructed in accordance with an illustrative embodiment of the present invention is depicted in FIG. 6. The user device 26 comprises a file delivery controller 29 which can be separate from, or part of, a data device 27 that is capable of receiving updates or other types of delivered files 12 (e.g., a new operating system, applications, software modules, graphics, databases, and so on). In addition, the controller 29 can also be shared by more than one data device 27. The data device 27 can be, for example and not limited to, a cellular phone, a navigation device, a satellite programming receiver, a telematics-enabled vehicle connection services unit (CSU), a portable computer or personal data assistant, a set-top box, a premises security system or other monitoring system, among other devices. Where the broadcast path 50 is implemented via a satellite digital audio radio service (SDARS) or HD Radio, for example, the broadcast receiver can be embedded in more devices (e.g., consumer electronics, including portable items and household items to provide connectivity to both 2-way and broadcast communication systems employed by the system 10).

The controller 29 operates in conjunction with at least one receiver 46*n* capable of receiving broadcast transmissions (e.g., via path 50 in FIG. 5), and at least one transceiver 48*n* (e.g., a cellular modem or WiFi transceiver) capable of receiving directed or addressed transmissions (e.g., via path 52 in FIG. 5), and transmitting signals via its associated 2-way communications network. The controller 29 can have a receiver capable of receiving broadcast transmissions 46; however, the functionality to receive 2-way communications can be provided by a device not fixed in the controller. For example, a cellphone can be occasionally brought into the controller environment and connected to the controller 29 (or other devices networked with the controller) to provide access to a 2-way communications network. For example, the 2-way delivery can be provided over a user's cellphone if and when the cellphone is linked to the head unit. The cell phone still connects through a local 2-way connection to the controller 29 (e.g. via Bluetooth, USB, etc.), but just to ensure the coverage extends to the 2-way supplied by the device. The transceiver 48*n* may also be a transceiver that communicates only locally (e.g., via Bluetooth or WiFi) with an internet connected device such as a wireless network hub or a cellphone, as long as the internet connected device provides a path to the update center 20. In other words, a local 2-way Bluetooth or WiFi connection provides access to a more global 2-way channel like internet (wired or wireless). Further, one of the antennas on the device 26 or connected cellular telephone can be an LTE wireless communication standard antenna. Other examples of telematics-enabled connection service units (CSUs), or user devices with multiple reception modalities (e.g., satellite and cellular transceivers, or components thereof) are described in commonly owned U.S. Pat. No. 8,452,328, and U.S. Patent Application Publication No. 2013/0226369, and U.S. Pat. No. 8,452,328, U.S. Patent Application Publication No. 2010/0106514, the entire contents of which are incorporated by reference herein.

A system controller 40 is configured to operate with the receiver(s) 46*n* and transceiver(s) 48*n* to receive parts 14 of files 12 transmitted to the user device 26 from the hybrid file delivery system 20, to combine received parts of the files and monitor the status of file completion, and to send responses (e.g., send various types of acknowledgements to the hybrid file delivery system 20 or other source of the file), among other operations. Illustrative system controller 40 operations are described below with reference to FIG. 12.

The controller 29 comprises a memory 42 for storing updates or other delivered files 12 and related information (e.g., one or more of file identifiers, file parts, completed files, file configuration information such as number and types of requested status reports or other response criteria, and file status information) for at least one data device 27. The memory 42 can be dedicated for storing updates or other delivered files, or be part of a shared memory space used for other applications, as well. The controller 29 can have a display 44 that is separate from, or part of, the data device 27. Further, other components of the controller 29 can be separate from, or part of, the data device 27.

Figure 7:
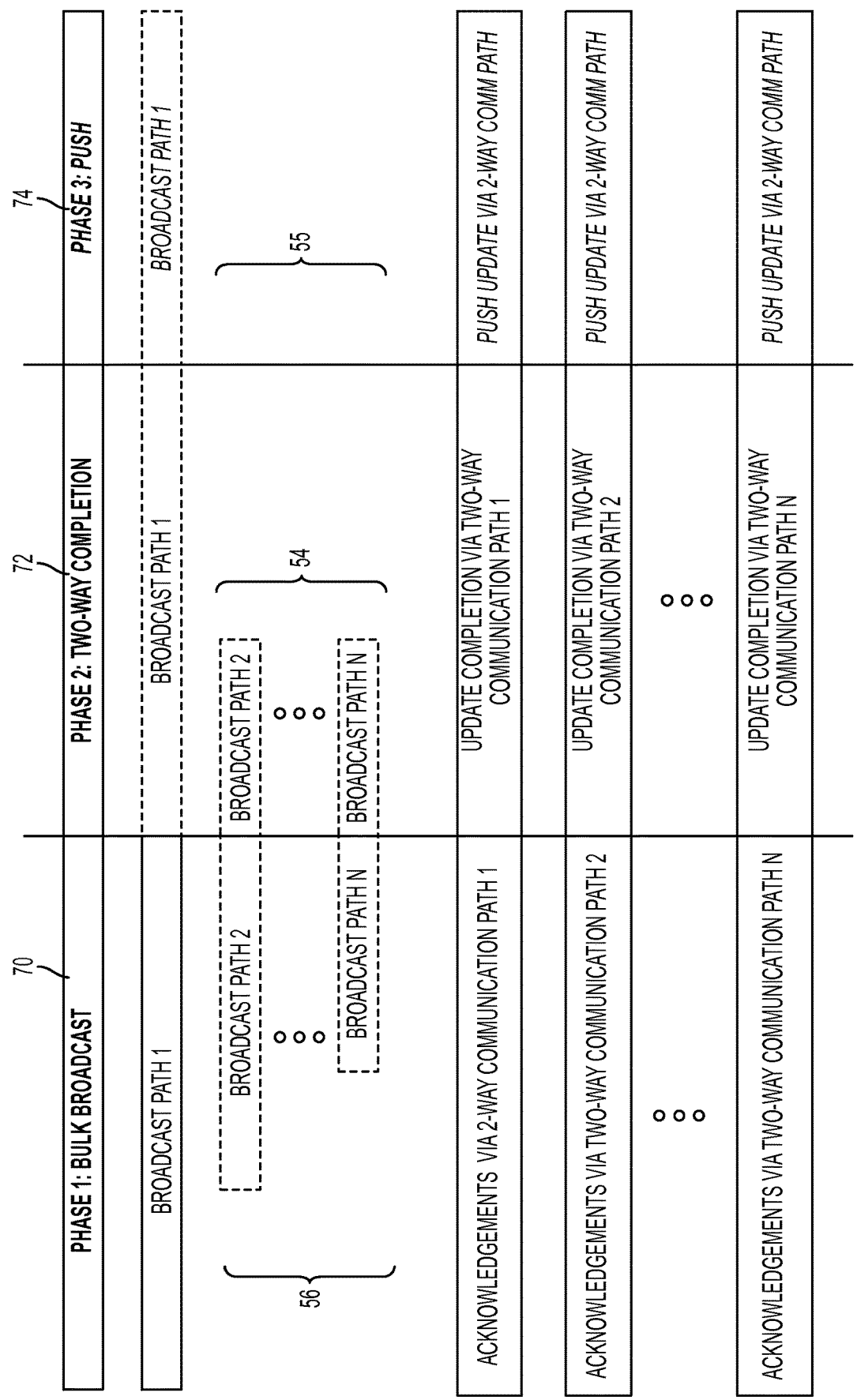
FIG. 7 shows phases of a system for file transmission constructed in accordance with an illustrative embodiment of the present invention.

With reference to FIG. 7 and in accordance with illustrative embodiments of the present invention, the system 10 employs at least two phases to deliver a file to target user devices 26. A Phase 1 is indicated at 70 and represents a period of time during which the file is transmitted to all or substantially all of a selected population of user devices 26 via at least one broadcast path or one-to-many path 50. To maximize cost effectiveness of delivering a file to many user devices 26, the hybrid file delivery system 20 first attempts to send as much of a file (or a set of files) 12 to as many of the target user devices 26 as possible during Phase 1.

Figure 5:
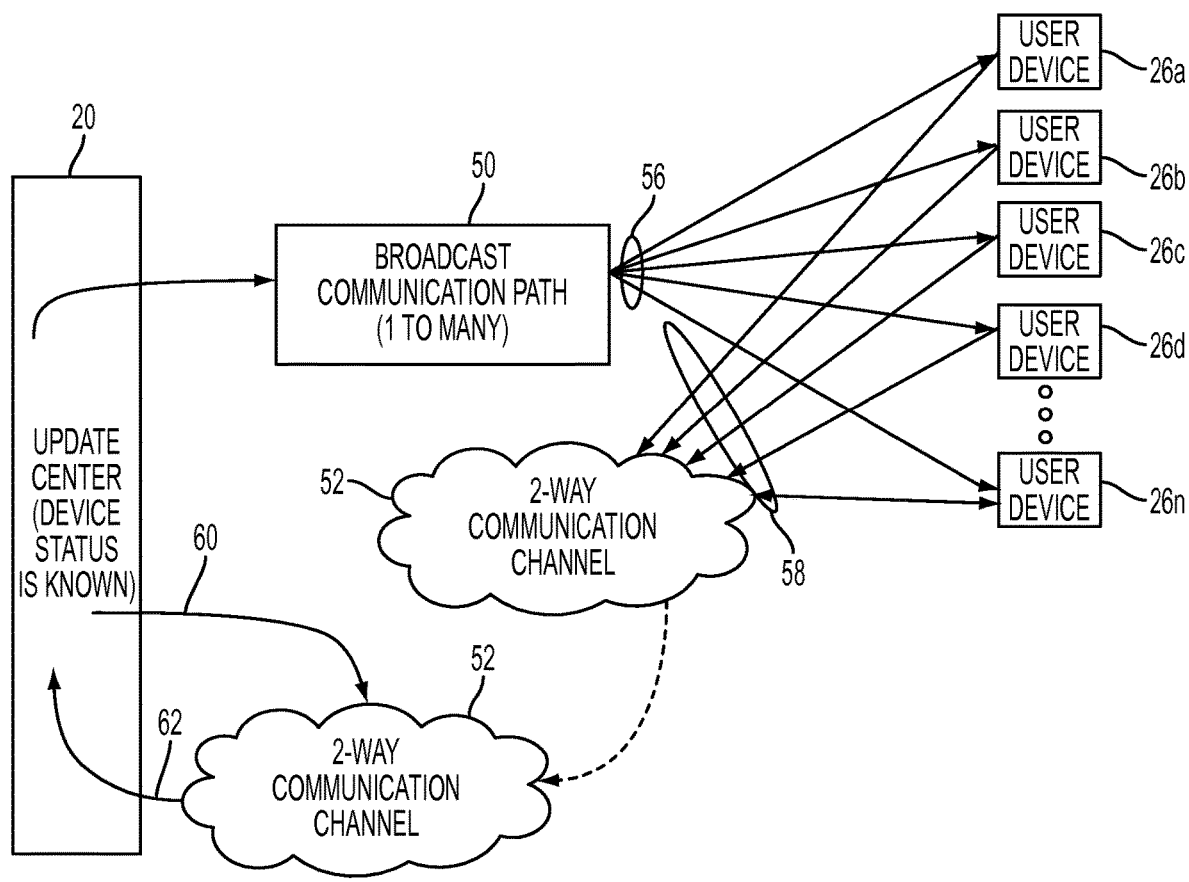
FIG. 5 shows a hybrid method for file transmission in accordance with an illustrative embodiment of the present invention.

In accordance with an aspect of the present invention, user devices 26 can be configured to receive the broadcasts during Phase 1, monitor the file parts or pieces transmitted using the broadcast(s), determine, for example, which file parts are missing to complete the file (or set of files) 12 or at least how far from completion is the file delivery at that user device, and send responses regarding the missing file parts or the status of file completion to the hybrid file delivery system 20 using a 2-way path as illustrated in FIG. 5. As indicated at 56, alternative broadcast paths 50 can be added, for example, such as when there are not enough responses (e.g., not enough "file delivery complete" acknowledgements) from the user devices 26 indicating that they have received the complete file (or set of files) 12. For example, another broadcast can be sent at a different time such as a peak time when more users are likely to receive the broadcast. It is to be understood that the user devices 26 need not be required to request missing parts of files. For example, the user devices 26 can be configured to provide automated feedback regarding status of file transfer or delivery (e.g., reports generated and sent from user devices at designated intervals or percentages to indicate status of successfully received file parts relative to total number of file parts), and the update center 20 can, in turn, be configured to rebroadcast if a significant number of the devices 26 auto report incomplete reception.

With continued reference to FIG. 7, a Phase 2 is indicated at 72 and represents a period of time during which missing parts of the file are transmitted to those user devices 26 that did not receive the complete file during the broadcast phase (i.e., Phase 1). During Phase 2, transmission over broadcast path(s) 52 may continue in Phase 2 as indicated at 54 in FIG. 7; however, user devices 26 that have not received a complete file delivery can be configured to request file update completion via the 2-way communication path 52 (e.g., responses indicating percentage of file that has not been received or simply "Incomplete" delivery status, or a request for missing file parts). For example, Phase 2 can commence with user devices requesting missing parts of file, and can be triggered, for example, by a broadcast message to the user devices 26, by a date (e.g., Phase 2 begins after a selected time period has elapsed after the last broadcast of Phase 1), by a hard coded timer or other timer at the user devices 26 that starts when the first file update packet is received, or by a message sent via the 2-way communication path, among other Phase 2 trigger events.

The criterion and/or instructions for when to request missing file parts or simply report status of delivery completion (i.e., percentage incomplete) can be provided to the user devices 26 as part of the file being transferred or delivered (e.g., part of each packet of the update 12) or in associated metadata, or via out-of-band signaling, or pre-loaded at the user device, or provided in an application, or transmitted in a message (e.g., via a 2-way path), among other methods. For example, the user device 26 can be provided with an App that can be dynamically loaded onto the user device (e.g., in connection with commencement of a phase of a particular file delivery or update campaign), and programs the user device to obtain the response criterion from a server (e.g., on a per file basis, or a file sender basis, among other bases). In addition, the criterion for when and what to report as file delivery completion status can also be provided to the user devices 26 using any one of these methods, for example.

For any user devices 26 which do not contact the hybrid file delivery system 20 (e.g., update center), the update center can contact them directly (e.g., via polling and based on stored information in the database 32 about target user devices and their respective file completion status) to determine which parts of the file they are missing, which can be in addition to or in lieu of the user devices initiating requests for missing file parts. In both cases (i.e., user device-initiated requests or update center polls of user devices), the missing parts of the file can be transmitted to these user devices via respective 2-way or point-to-point (P2P) communication paths 52.

As shown in FIG. 7, a Phase 3 indicated at 74 can be provided in conjunction with Phase 2, or in lieu of Phase 2. During Phase 3, transmission over broadcast path(s) 50 per Phase 1 may continue; however, full files or updates are pushed to user devices 26 (e.g., via 2-way paths 52) that have not requested missing file parts or pieces, for example. Thus, Phase 3, although perhaps necessary in some cases, may be the most expensive option for delivering a file to user devices, and criterion can be established to minimize or eliminate the need for Phase 3 transmissions within the budget and time constraints of the file sender.

Phase 1 will now be described with reference to FIG. 8. In the illustrated example, a file (or a set of selected files) 12 to be delivered shall be referred to as an Update 12 (e.g., a software update or other type of file or data to be transferred or delivered to target users) for illustrative purposes. As stated above, other types of files comprising other types of content or data and having different functions can be sent to user devices. The Update 12 undergoes processing as indicated at 80 to break the update file (or each files in a selected set of files for an update) into packets or pieces or other parts, as indicated at 14, such that receiving a sufficient number of the packets or parts enables the user device 26 receiver to construct the full Update 12. Each packet or part, for example, can contain information about the full Update (e.g., file identifier and file part information such as part identifier or "Packet m of N" or Update size, etc.) and/or otherwise be associated with other metadata providing such information (e.g., metadata provided elsewhere within the broadcast stream or by an ancillary stream) so that user devices 26 that have received only a part of the Update 12 can determine what file part or parts 14 are missing.

Figure 8:
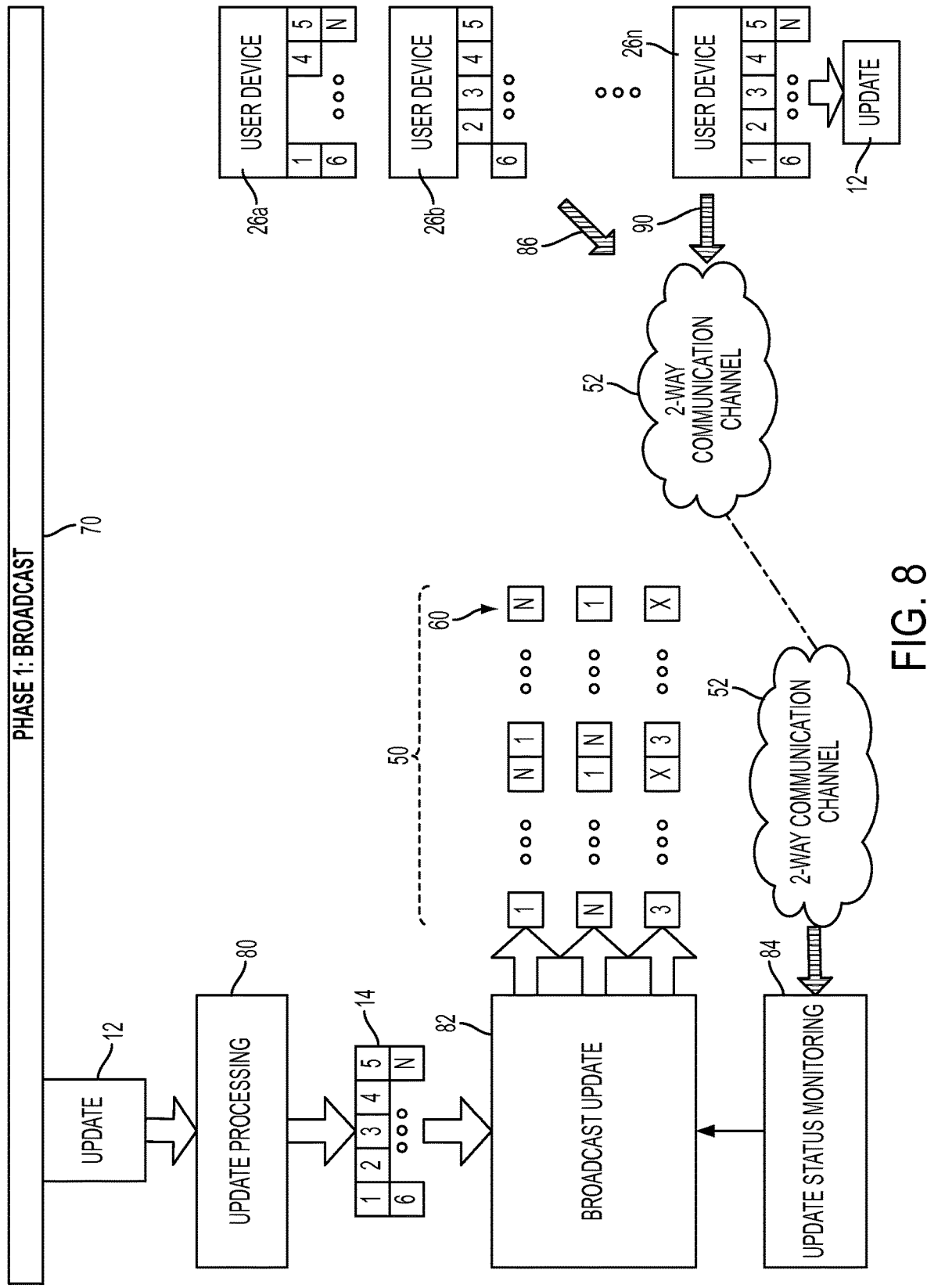
FIG. 8 shows a broadcast phase for file transmission in accordance with an illustrative embodiment of the present invention.

As indicated at 60 in FIG. 8, Update packets or parts 14 are transmitted over at least one broadcast path 50. As indicated at 60, if multiple broadcast paths 50 are used, the sequence of packet or part 14 transmission can be varied on each path so that reception of duplicate packets on different paths at the same time is avoided, and thereby facilitate user devices being able to receive most, if not all, file parts 14 during Phase 1. As indicated by the user devices 26a through 26n in FIG. 8, different user devices receive packets or parts of the transmitted file in different orders and in different quantities, depending on reception and signal coverage.

As indicated at 90 in FIG. 8, user devices 26 that have received the full Update can send an acknowledgement to the update center. Other user devices 26 can send different types of responses 86, depending on the degree of file completion and file sender criterion, for example. The update center 20 can store and monitor acknowledgements in the database 32 and then use this information to determine when to move to the next phase. (e.g., when 90% . . . or 99% of user devices 26 report the update is complete), as indicated at 84. If 100% of user devices have received the update (e.g., or an operationally acceptable target number that is less than 100%), the broadcast(s) in Phase 1 can stop, or Phase 1 can be terminated at some other point such as a selected time period after the first broadcast.

Figure 9:
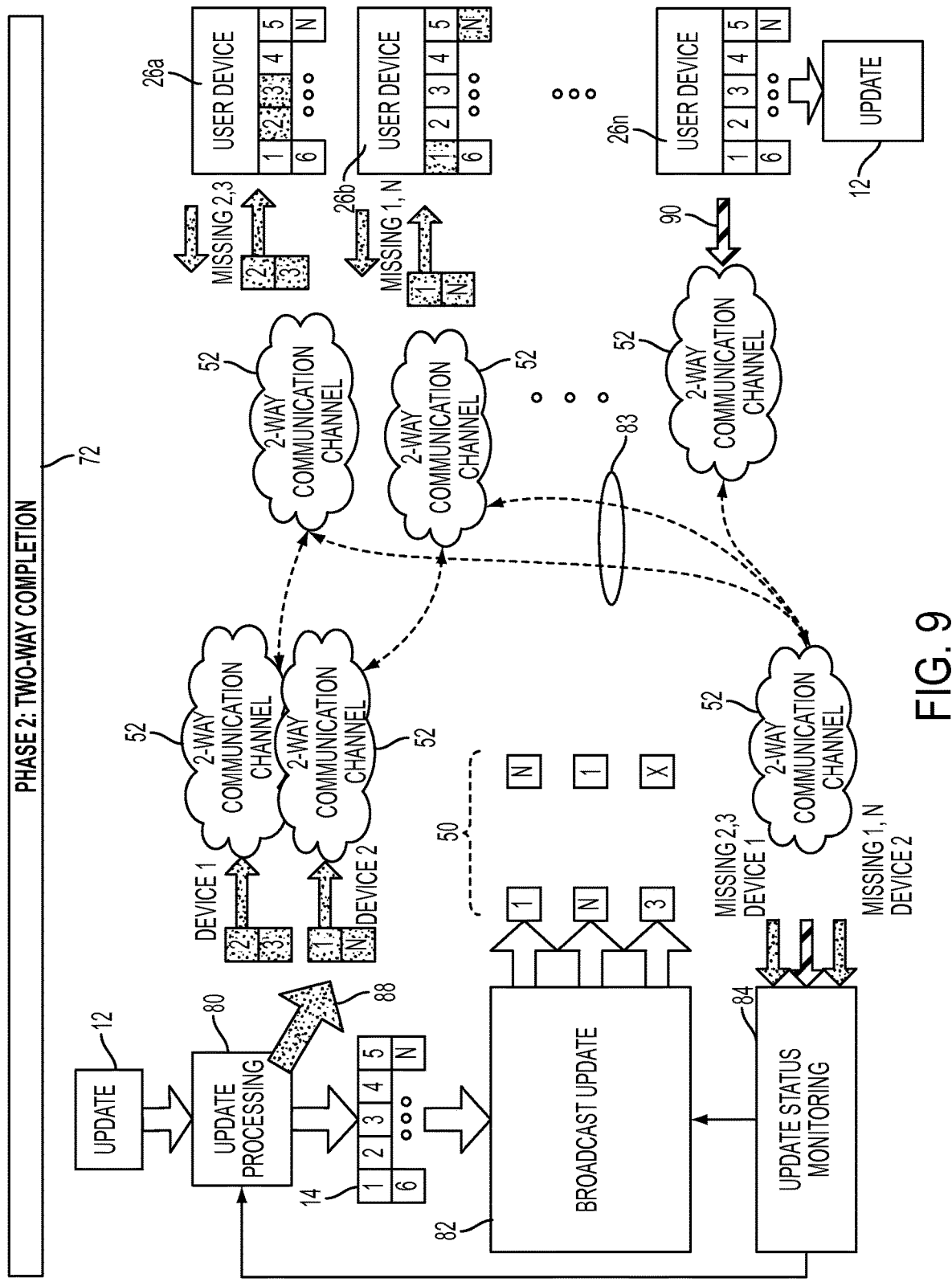
FIG. 9 shows a two-way delivery completion and reporting phase for file transmission in accordance with an illustrative embodiment of the present invention.

Phase 2 will now be described with reference to FIG. 9. As indicated at 88, specific packets or file parts 14 that are reported missing by the affected user devices 26 to the update center 20 can be transmitted to those devices in Phase 2 via respective 2-way communication paths 52. Further, the broadcast can continue as indicated at 82. As described with reference to Phase 1 exemplified in FIG. 8, different user devices 26 receive packets or parts 14 of the transmitted file 12 in different orders and in different quantities, depending on reception and signal coverage. In addition, the user devices 26 continue to send responses to the update center 20 such as acknowledgement of complete update delivery as indicated at 90, and requests for missing packets or parts 14 or reports on progress of update completion as indicated at 83. The update center 20 can continue to process requests from user devices 26 for missing update packets or pieces 14. Depending on the specifics of the update, devices 26 which have not received the complete update 12 at the end of Phase 1 may not request the missing pieces if the utility of the update is not worth the cost of 2-way transmission. Request for completion of the update 12 may be predicated on a user action requesting an operation at the mobile device.

Figure 10:
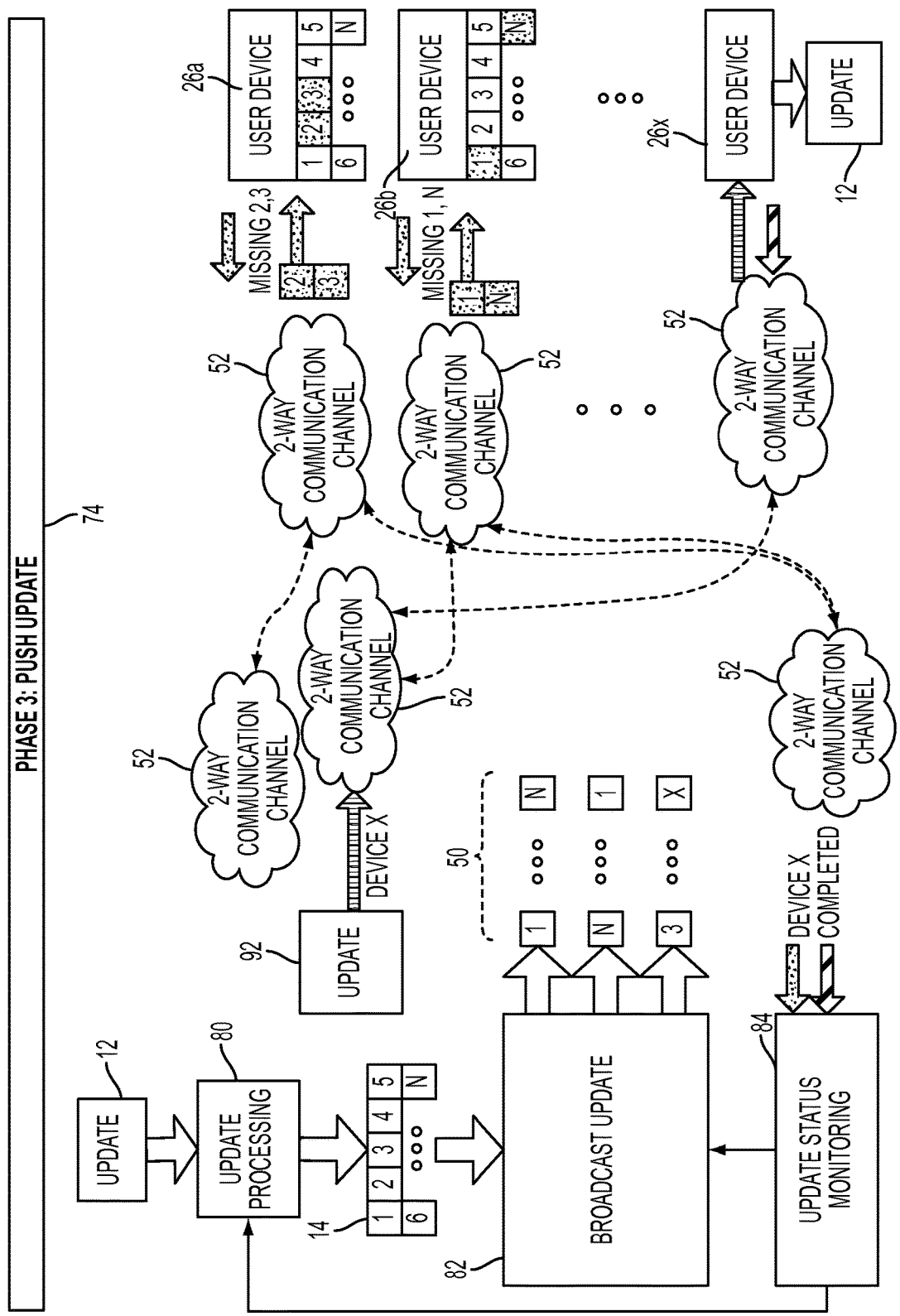
FIG. 10 shows a push phase for delivery completion of file transmission in accordance with an illustrative embodiment of the present invention.

FIG. 10 exemplifies how an Update 12 can be pushed to a specified user device 26x during Phase 3 in accordance with an illustrative embodiment of the present invention. As stated above in connection with FIG. 7, full files or updates 92 can be pushed to user devices 26 (e.g., user device 26x in FIG. 10) that have not requested missing pieces, for example, via the communication paths 52. Thus, Phase 3 may be the most expensive option for delivering a file to user devices, and criterion can be established to minimize or eliminate the need for Phase 3 transmissions within the budget and time constraints of the file sender.

Illustrative Transmission Methods

In Phase 1, files 12 can be broadcast or multicast to many user devices 26 over one or more one-to-many paths 50 such as via satellite transmission paths or via a terrestrial wireless network (e.g., microwave, cellular, and so on), or otherwise transmitted wirelessly or via wireline communications (e.g., wired networks) to reach the target users devices 26. For mobile user devices, for example, Phase 1 can employ wireless transmission of the same content (e.g., Update parts or packets 14) to many users via any of various content delivery systems such as satellite digital audio radio service (SDARS) systems or other digital audio broadcast (DAB) systems, radio systems such as FM radio systems or a high definition (HD) or IBOC radio systems, a Direct-to-home satellite video system or cable television system or HD TV, K-band or C-band satellite systems, among others.

Phase 2 transmission of missing file parts 14 (e.g., and Phase 3 transmission of files 12) to respective user devices 26 can be via a 2-way Internet Protocol (IP) system or streamed over an internet, cellular or dedicated IP connection (e.g., 2-way IP). For mobile users, for example, Phases 2 and 3 can employ cellular transmission to a user device over a 3G or 4G LTE or other type of cellular network or WiFi.

In accordance with an advantageous aspect of illustrative embodiments of the preset invention, mobile user devices 26 such as telematics-enabled vehicles can employ transmission methods in Phase 1 and Phase 2 (and/or Phase 3) based on the knowledge that the vehicles can be in cellular (i.e., 2-way) and satellite (i.e., broadcast) coverage at substantially the same time, or at least they can be covered by both methods simultaneously. The system 10 can be configured to select and use broadcast updates or file delivery to the vehicles over the broadcast transmission path (e.g., which could be any broadcast path and not just satellite transmission such as terrestrial broadcast or cellular network in broadcast mode) in preference to a 2-way communication path in order to minimize cost. Further, the system 10 can transmit files 12 to all mobile devices via satellite (i.e., the broadcast path 50) regardless of whether the individual devices 26 are in cellular coverage or not. To transmit responses, the mobile devices can use low or no-cost 2-way communications for acknowledgements when available (e.g. WiFi connection when vehicle is in the garage) or existing data plan on consumer smart phone in the vehicle, before using higher cost communication paths (e.g., via a 4G LTE vehicle embedded modem). Further, the user device 26 with WiFi connection can be configured as a vehicle-to-home device whereby the user device can establish a two-way path for wireless internet access (e.g., when it is in range of the user's home or other site that supports wireless internet connection) by which to download missing file parts 14.

In the example of files 12 broadcast in Phase 1 via satellite, these broadcasts can cover a larger geographic area than other broadcast methods and even cellular systems. Further, providing files 12 to user devices 26 via satellite, including placing corresponding broadcast receiver hardware in many consumer devices, in accordance with illustrative embodiments of the present invention can leverage value from the existing broadcast infrastructure. The file parts 14 can be broadcast as part of a program content stream comprising other content (e.g., a composite SDARS broadcast stream generated at the programming center). It is to be understood that broadcast file parts 14 can be sent as part of a program content stream that is not limited to audio programming but can include video content, multi-media content (e.g., one or more of audio, video, graphics, photographs, maps and so on), and that the program channels can include any assortment of music, news, talk radio, traffic/weather reports, comedy shows, live sports events, commercial announcements and advertisements, and so on. It is also understood that the broadcast file parts 14 can be sent as part of a non-program stream, or a dedicated or undedicated stream. Further, the file parts 14 can be sent concurrently with programming or other broadcast messages or data or not, and in the same stream or in a different stream.

Illustrative Types of Files 12

The distributed files 12 can be, for example, data files such as maps, or program code, databases or a table or other grouping of data or data structure, messages, multimedia content or essentially any type of content such as audio, video, and graphics including but not limited to content for entertainment, electronic books, instruction manuals, educational materials, regulations and guidelines, information for emergency preparedness, and so on.

Illustrative Methods for Processing Files 12 into Parts or Packets 14

As stated above, the system 10 is advantageous because it can deliver relatively large files 12 to many user devices 26 in a cost effective manner. In accordance with an illustrative embodiment of the present invention, files 12 can be divided or otherwise processed (e.g., via various coding methods) into a group of smaller parts or pieces of data 14 (e.g., packets, streams, data structures, smaller related files of different sizes, groups of bits, or other various subcomponents that can be combined to create or otherwise reconstruct the file 12. The files 12 can be processed by an encoder, for example, that is integral to, or separate from, the hybrid file delivery system 20.

In accordance with an illustrative embodiment of the present invention, a file 12 can be processed into smaller parts 14 using carousel transmission of the file data (e.g., uncoded block transmission). For example, the file 12 is segmented into smaller blocks which are encapsulated and broadcasted as individual packets, with header including identification of the part of the file the encapsulated block corresponds to. The hybrid file delivery system 20 engages with an uplink to transmit each block of the file, at a target bitrate for the file, until a selected overall file broadcast period expires, for example. If all blocks of the file have been transmitted before the end of the broadcast period, the uplink starts repeating transmission of blocks of the file that have already been transmitted. Each repeated block is useful to the receivers 46 that missed the previous transmissions of the same block on a previous transmission cycle (e.g. due to low signal or receiver off-the-air condition). Each of these cycles is deemed one turn of the carousel.

Each receiver 46 reconstructs as much of the original file 12 as possible (e.g., ideally fully reconstructing the file 12) based on the blocks 14 (e.g., parts of the file) that are received. A packet erasure occurs when a receiver 46 misses reception of a packet, for example, due to channel errors (e.g., low signal) or receiver off-the-air condition. As the packet erasure rate increases, the average time required for a receiver 46 to receive all unique blocks of the file, or even a high percentage of unique blocks, becomes increasingly high. Using Phase 2 transmission modality (e.g., sending missing file parts 14 to selected user devices 26 via a 2-way communication path 52) can overcome this problem with carousel delivery. This carousel delivery problem, however, can also be overcome using a different file processing method. For example, in accordance with an illustrative embodiment of the present invention, a file 12 can be processed into smaller parts 14 using erasure correction coded packet transmission. An example of erasure correction encoding is described in Elias, P., Coding for Two Noisy Channels, in *Information Theory* (Colin Cherry, ed.), Academic Press, New York, pp. 61-74 (1956), which is incorporated by reference herein.

The application of erasure correction coding (i.e., versus uncoded block transmission) can greatly reduce the time required to receive enough packets 14 to fully reconstruct a file 12 or, relevant to the hybrid transmission system 10, to greatly reduce the time required to receive a very large percentage of the blocks 14 needed to decode the file 12. This time advantage grows larger as the packet erasure rate grows larger. As in the simple uncoded block transmission model, the file 12 is segmented into smaller blocks. Instead of transmitting each block (encapsulated into a packet) directly, however, each block is first erasure correction coded. An encoder (e.g., at the system 20, or at an associated uplink) generates up to N (erasure correction) coded blocks where N is greater that K, the number of blocks that make up the file size. A receiver 46 can decode (reconstruct) the file from any K+$\varepsilon$ of the N blocks that it first receives, where $\varepsilon$ is some number of required extra blocks>=0. Different erasure codes have different characteristic $\varepsilon$ values. The blocks that the receiver 46 does not receive are erased either due to channel errors (e.g. low signal) or due to the receiver being off-the-air. The erasure code does not correct for errored blocks (i.e., blocks containing bit errors). If a block is received with known errors (e.g., errors not corrected by an error correction code applied at a lower transport layer of the broadcast), the block is thrown out (e.g., counted as erased).

A particular erasure code will allow for the encoding (generation) of a maximum number of unique coded blocks (N) that is greater than the number of equivalent uncoded blocks (K) that constitute the file size. When a subset K of the N generated coded blocks is identical to the K uncoded blocks of the file, the code is a systematic code. A particular code will allow for the decoding (reconstruction) of the original file from a minimum number (K+$\varepsilon$) of available (received) coded blocks. The most efficient code provides $\varepsilon$=0 so that no extra blocks over the original file size are required to decode the file. The Reed Solomon code and the K+1 Parity Check code are examples of such an optimally efficient code. Other codes require $\varepsilon$>0 where $\varepsilon$ is either a fixed value or a probabilistic value that is dependent on which particular coded blocks of the N blocks are used in decoding (e.g. $\varepsilon$=0 with probability a, $\varepsilon$=1 with probability b, . . . , where the probability increases with increasing $\varepsilon$).

The larger the ratio N/K, the more uniquely coded blocks can be generated, and correspondingly, the longer the time duration that a file can be transmitted (e.g., broadcasted)

before the uplink must start repeating transmission of previously transmitted packets (i.e. back to the carousel delivery problem).

When the expected transmission period of a file at a specific bitrate results in transmission of a number of packets greatly exceeding the file size in number of packets, it is advantageous to utilize an erasure code that provides N much greater than K to avoid the carousel delivery problem. The Reed Solomon code can provide N>>K, if arithmetic operations are done within a much higher order finite field (e.g. number of blocks N=2^16 requires a GF(2^16) (i.e., a Galois field of order 2^16) which requires additional memory and/or processing resources.

In the case of the hybrid transmission model, the device may have received a first X1 number of blocks from the broadcast network. The device may have also already performed some incremental level of erasure correction decoding using all or some of these first X1 blocks. To then complete block delivery via the 2-way network, the device requests delivery of an additional X2 number of blocks from the 2-way network, such that $X1+X2=K+\varepsilon_a$, the number of blocks needed to successfully complete decoding with some desired probability of success, a ($\varepsilon_a=0$ with probability 1 for the Reed Solomon code). If decoding is unsuccessful, the device will continue to request delivery of one or more additional blocks from the 2-way network, attempting completion of decode again, until decoding is finally successfully completed. The device may request delivery of uncoded blocks or erasure correction coded blocks, or some combination of the two, from the 2-way network. The device may identify each individual requested block, for example by a block index identifying an uncoded block's position in the file, or by a block index identifying an erasure coded block's position 1 to N within the overall series of possible erasure correction coded blocks. The device may also identify the requested blocks as a range of block indexes, for example requesting uncoded block index (K−X1) to index K.

Files 12 can also be transmitted using a Reliable File Delivery (RFD) protocol (e.g., a data encoding technology described in commonly owned U.S. Patent Application Publication No. US 2010/0106514, the entire contents of which are incorporated by reference herein).

Nonetheless, conventional carousel delivery can be less computationally intensive than coding such as erasure correction coding or RFD or similar encoding technology. The method for preparing files 12 prior to transmission (e.g., via the Phase 1 broadcast transmission modality), that is, uncoded block transmission or encoded transmission, can be determined at the time of file delivery campaign set up at a BO console or other hybrid delivery system operator interface 34, for example, depending on the file size of the update 12.

In addition, files 12 can be encrypted, unencrypted, or partially encrypted, with encryption (whole, partial, or none) being performed at the transport layer or at the service layer.

Illustrative Methods of Hybrid File Delivery System 20 Operation

Figure 11:
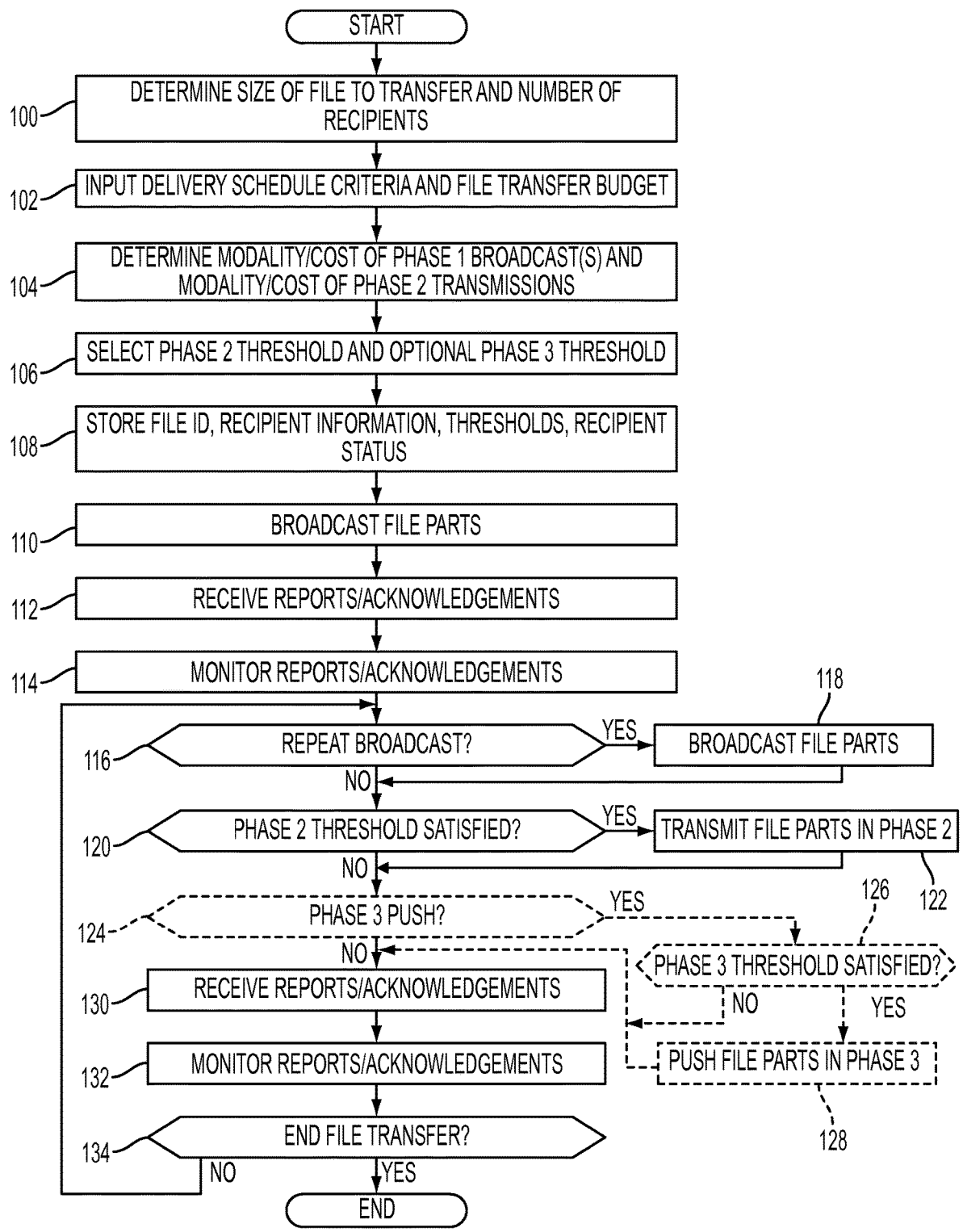
FIG. 11 shows a method for file transmission in accordance with an illustrative embodiment of the present invention.

In accordance with an illustrative embodiment of the present invention, the hybrid file delivery system 20 can be configured to perform a number of operations to transmit a file 12 (or set of files selected for updating) to many users (e.g., users in a relatively large geographic area), as shown in FIG. 11 for example. For each party desiring to transmit a file 12 to various user devices 26, the system 20 can maximize cost benefit for delivery of that file 12 by determining to what extent each of at least two different transmission modalities or phases is used based on the monitoring of file transfer completion status at the user devices 26. By way of an example, the processor 28 of the system 20 can be programmed (e.g., via program code stored in the memory 30) to perform the operations exemplified using FIG. 11 (e.g., by controlling transmission of file updates 12 via the broadcast subsystem 22, and/or the 2-way communications subsystem 24 and in accordance with information stored in the database 32).

When a party (not shown) wishes to transmit a file 12 to a number of user devices 26, the size of the file 12 and the number of recipients is determined (block 100). The party can, for example, communicate file delivery campaign specifications to an operator of a BO console 34, who, in turn, can enter into the system 20 such information as specifications for which users are to be targeted to receive the file 12, which paths 50 and 52 or modalities (e.g., Phase 1, 2 and/or 3) to employ and when, and what types of responses to instruct the target user devices 12 to send in terms of file delivery status of completeness and, optionally, requests for missing file parts 14. Examples of target user addressing and the types of information that can be stored at the database 32 and used for file delivery are provided below. The file 12 can be a navigation system map, or vehicle on-board software update, or educational material, among other types of files. The intended recipients can be user devices 26 such as telematics-enabled vehicles of a particular make and model year, or user devices 26 registered for a navigation application, or recipients registered to receive educational materials and/or their respective user devices to be employed to view the educational materials, or users whose profiles stored at the database 32 match a number of criteria designated by the party setting up a file delivery, among other types of recipients and/or their user devices 26. The file and recipient information can be provided by the party requesting hybrid file delivery service via the system 20, or the recipient information can be determined by the system 20 from the file 12 itself and/or other data regarding the file 12 and intended recipients provided by the party. For example, the database 32 can maintain user profile information such as interests, or devices owned, or subcomponents of devices owned, or information on various groups or populations to which a user is a member. Thus, when a particular file delivery campaign is being set up, the file sender may only have to identify the device or subcomponent being updated, or provide descriptors that can then be used by the update center or other controller to identify user devices belonging to a particular population (e.g., for promotional or educational updates). The file sender, therefore, need not provide VINs or a range of VINs to achieve an update of a particular device or subcomponent that is known to be in vehicles or a particular make, model or year.

With continued reference to FIG. 11, the party can also optionally provide file delivery schedule criteria and/or file delivery budget information (block 102). File delivery schedule criteria can be, for example, a deadline by which all intended recipients must receive a transferred file 12, a target deadline, an indication of how urgent the file delivery is, or a specification for how many or how often the party wishes to receive reports of the status of the file delivery by the intended recipients (e.g., a party can require multiple acknowledgements from user devices such as a first acknowledgement for when file transfer is 50% complete and second acknowledgement when file delivery is 100% complete), among other information. File delivery budget information can be, but is not limited to, budget or range of prices for completion, or at least partial completion, of the file delivery or transfer to the intended recipients. For example, a party needing to send an urgent file update can specify a shortened time period for confirmation of file completion by all intended file recipients, and therefore commence Phase 2 sooner relative to Phase 1 than a party sending a less urgent file. A party sending a less urgent file, or having to send a file within budget constraints, can commence Phase 2 much later after the commencement of Phase 1 (e.g., after several Phase 1 repeat broadcasts or after a selected period of time has elapsed).

With reference to block 104 in FIG. 11, the system 20 is configured to determine modality/cost of Phase 1 broadcast (s) and modality/cost of Phase 2 transmissions. The modality for each of the Phases 1 and 2 can be predetermined, or selected (e.g., manually by the party or personnel at an update center, or automatically by the processor 28 at the system 20) where more than one communications system or network is available for a particular phase. The cost or estimated cost of Phase 1 or Phase 2 can be determined or not. The modality of Phase 1 can be a form of broadcast or multicast transmission and can be implemented via a wireline or wireless transmission system. The modality of Phase 2 can be a direct or point-to-point transmission that allows 2-way communication and can be implemented via a wireline or wireless transmission system. In any event, block 104 of FIG. 11 can be exemplified by the processor 28 being configured to commence Phase 2 at a selected point in time after commencement of Phase 1, whereby the selected point in time is based on one or more of various factors such as number of desired Phase 1 broadcasts/multicasts or retransmissions (e.g., based on time and cost constraints), bandwidth needed for file delivery, number and/or location of recipients and/or their user devices 26. Another factor that can impact when to commence Phase 2 after commencement of Phase 1 is the degree to which the system 20 is configured to monitor responses from the user devices 26 to one or more Phase 1 transmissions. User device responses can be, for example, reports of partial file transfer completion (e.g., x percent), requests for designated parts or pieces of a file, or acknowledgements or other indications of completed file delivery or other status or condition relating to the file delivery at a user device 26. For example, the system 20 can be configured (e.g., the processor 28 programmed) to not commence Phase 2 or Phase 3 until a selected percentage of the target population of user devices 26 for that file delivery have reported a selected percentage of the file transfer being complete or other selected status or condition.

Responses (e.g., progress reports) from the user devices 26 (e.g., including not only file complete acknowledgements but also data indicating percentage of file received so far) can be used to modulate the amount of broadcast bandwidth and/or relative block transmission rates used to send the broadcast data to more closely meet the file completion objectives of the sending party. The throttling can either increase effective transmission rates (e.g., if progress reports indicate the devices 26 are collectively not receiving the file as quickly as needed) or decrease effective transmission rates (e.g., if progress reports indicate the devices 26 are collectively receiving the file more quickly than needed, so the effective broadcast transmission bandwidth can be shifted to other higher priority purposes).

With reference to block 106 in FIG. 11, thresholds for switchover to or commencement of Phase 2 or Phase 3 after Phase 1 has commenced, and other configuration parameters (e.g., types of status responses to be received from user devices 26), can be configured or otherwise designated at the system 20 via the BO console 34 and stored in the memory 30 or database 32 for use by the processor 28, for example. These stored thresholds and/or configuration parameters can therefore affect the extent to which each of at least two different transmission modalities or phases is used. The thresholds can be, for example, a selected percentage of the intended recipients or user devices 26 that have reported complete file delivery, or one or more other percentages of partial completion (e.g., a percentage selected from the range of 85% and 99%). Another type of threshold can be the number of Phase 1 transmissions that need to occur before Phase 2 or Phase 3 is commenced.

By way of illustrative examples, to switch from broadcast (i.e., Phase 1) to 2-way, point-to-point or IP (i.e., Phase 2) file distribution, the hybrid file delivery system 20 can end Phase 1 after a specified percentage of target receivers or user devices 26 have indicated that they have received the complete file via a broadcast or multicast path 50. For example, after 90% of target vehicles have received the complete file via broadcast 50 as indicated by feedback from user devices 26 via respective 2-way paths 52, the remaining 10% of the user devices 26 will be sent the file 12 or the missing pieces 14 of the file via a 2-way link 52. In such an example, target devices 26 are only required to indicate complete file reception only, that is, no intermediate status updates are needed. Alternatively, the hybrid file delivery system 20 can end Phase 1 or at least commence Phase 2 after 100% of target user devices 26 have indicated that they have received at least a specified portion of the file via the broadcast path 50. For example, as each target user device 26 receives 90% of the file, it contacts the distribution or update center 20 and immediately receives the remaining 10% via a 2-way transmission path 52. Such an implementation therefore can require target devices 26 to indicate when 90% of file has been received such that 100% of the target user devices 26 get at least 90% of file over broadcast channel 50 and, most likely, many of the user devices 26 receive the remaining 10% of the file over a 2-way path 52. The switchover of hybrid distribution scheme from Phase 1 to Phase 2 can also be triggered by reaching a threshold of remaining communications required. For example, each target user device 26 can be configured to report its file completion status at fixed intervals such as every 10% or every 20% of the file 12 that is received. When the remaining file parts 14 that are required to be transmitted reach a predetermined point or threshold (e.g., such as less than 10% of the total file size through any combination of some fraction of target receivers getting the full file as well as remaining receivers getting some fraction of the file ranging from 20% to 80%), then Phase 2 begins. Alternatively, switchover to or commencement of Phase 2 can be configured at the system 20 to begin a fixed time after the start of the Phase 1 or after a designated number of Phase 1 transmissions of that file 12, regardless of how many target receivers have received the first file 12 or portions 14 thereof. It is to be understood that other threshold criteria can be specified for Phase 2 or Phase 3 commencement.

As shown in FIG. 2, the hybrid file delivery system 20 can comprise or otherwise have access to a database 32 for storing file transfer information. With reference to block 108 in FIG. 11, the system 20 can be configured to store file transfer information comprising, but not limited to, (a) an identifier for a file to be delivered to a group of recipients (e.g., which can include unique identifiers for each of a plurality of files to be delivered) or other order number, job or file delivery campaign number or other indicator to identify the task of delivering a particular file to a plurality of recipients, and optionally file part 14 information (b)

identifiers for target user devices 26 or users, or other indicators for respective recipients intended to receive the file or even a selected subset of these recipients (e.g., a selected percentage or sample of the intended recipient population for purposes of monitoring and tracking the status of completion of the file delivery task or job), (c) one or more fields for indicating status of a recipient (e.g., a field or other data element that can be flagged or otherwise modified to indicate when the file delivery for that user device is complete, or a field(s) for indicating percentage of file transfer remaining, or a field(s) or other data element(s) representing responses sent or messages received by the user device, and (d) optionally configuration data such as the threshold values for entering Phase 2 or Phase 3, and parameters for each phase such as repeating Phase 1 a designated number of times within a designated period or not employing Phase 2 until a user reports a selected percentage of the file missing. It is to be understood that the database 32 need not store status data for every intended recipient, but rather may only store status data for those devices that have sent a request or response to the update center via a 2-way path 52, or store no per-user delivery status information at all. In other words, the system 20 could broadcast the updates with data used for target self-qualifications (i.e., without the system 20 having to know exactly which or how many qualified target devices 26 are in the field, and with the user devices being configured for performing self-identifying operations based on the self-qualification data that was sents). In this way, the system 20 need only maintain a tally of those targets that later report back "didn't receive all the update" through various methods of 2-way interactions.

By way of an example, the hybrid file delivery system 20 (e.g., a server) can comprise or have access to a database (e.g., database 32) that stores data from car manufacturers or original equipment manufacturers (OEMs) (e.g., via periodic data exchanges) comprising lists of vehicle identification numbers (VINs) or subcomponents' identifiers or user identifiers, software versions for products or subcomponents to be updated via file delivery by the system 10, and user profile information. The user profile information can include, but is not limited to biographical and demographic data (e.g., name. age, race, and so on) and information regarding products or subcomponents owned by that user that may be subjected to a file update, as well as data relating to interests, preferences (e.g., broadcast program channel and content likes and dislikes) and user behaviors. For example, the database 32 can store monitored product data relating to product health such as mileage for vehicles or durations of use or sensor outputs. The database 32 can store user behaviors data such as travel patterns or history of location data obtained via a navigation system or portable GPS receiver. For example, a database can store information relating to when a vehicle is typically driven by a particular user and therefore more likely to receive a file update during Phase 1. The database 32 can be self-adapting whereby a user employs a 2-way path 52 to the update center 20 to report vehicle health or other user profile data. The database can also store channel and topic affinities as disclosed in commonly owned U.S. Pat. No. 8,490,136 (which is incorporated by reference herein) for correlation with user preferences (e.g., as indicated by favorite content and channel metrics obtained from user devices 26) to facilitate determining target users for delivery of certain types of files and addressing of those users during a file delivery operation (e.g., without having to specify VINs or a range of VINs to set up a vehicle update campaign).

With reference to block 110 in FIG. 11, the system 20 is configured to broadcast file parts 14 to intended recipients' user devices 26. The system 20 can process the file 12 to generate the file parts 14 or the file can be processed by an external device and provided to the system 20. The file parts 14 can each be provided or otherwise associated with a file part identifier to facilitate their combination to reconstruct the file at the user devices when all or most of the parts have been successfully received. The file part identifiers can be provided in a header or wrapper of the file part when transmitted to the user devices 26, or embedded in the transmitted file part (e.g., with encoding), or transmitted to the user devices 26 using in-band or out-of-band signaling (e.g., metadata), for example.

With reference to blocks 112 and 114 in FIG. 11, the hybrid file delivery system 20 receives responses from the user devices 26 to the broadcast/multicast transmission(s) via the 2-way communications subsystem 24. As will be discussed below in connection with FIG. 12, the user devices can be configured to generate and transmit responses to the system 20 when designated criteria are met. For example, user devices can transmit an acknowledgement to indicate when they have received all of the file parts needed to complete a file transfer, or requests for retransmission of designated file parts, or status reports relating to the degree or percentage to which the file transfer remains incomplete. The system 20 can be configured to store information in the database 32 relating to the responses received from the user devices 26 targeted to receive a selected file transfer such as a message identifier, a recipient or user device identifier and its status of file transfer completion. Based on the stored information, the system 20 can be configured to remain in Phase 1 including send a retransmission or not in Phase 1 (blocks 118 and 118), commence direct communication of file parts to user devices in Phase 2 (blocks 120 and 122), or optionally push file parts to designated user devices in Phase 3 (blocks 124, 126 and 128), depending on whether Phase 2 or Phase 3 thresholds are satisfied. As stated above, the thresholds can be specified by a party setting up a file delivery operation or can be automatically determined by the processor 28 based on any of different parameters such as size and urgency of the file, transmission bandwidth, budget considerations, and responses received target user devices relating to file delivery completion status.

As indicated via blocks 130 and 132 in FIG. 11, the hybrid file delivery system 20 continues to receive responses from the user devices 26 to the Phase 1, 2 and/or 3 transmission(s) via the 2-way communications subsystem 24, and store information in the database 32 relating to the responses. FIG. 11 describes the operations of the system 20 to deliver an illustrative file 12. It is to be understood that the system 20 can transmit other files 12 (e.g., via Phase 1, 2, and/or 3) for different file delivery campaigns and monitor responses for respective populations of intended recipients for all files simultaneously. In other words, the system 20 is configured to transmit different files and monitor responses for those different files 12, as well as for the same file 12 transmitted at different times and/or by different modalities, either simultaneously or in another order. The completion of the file transfer (block 134) can be determined by the system 20 based on the stored information in the database 32 relating to the responses from the user devices 26 and on other optional criteria. For example, the party requesting the file delivery can require that all intended recipients of a file must acknowledge completion of the file transfer, or can merely require that a percentage of the recipients acknowledge completion of the file transfer, or can simply end the file delivery task after a designated period of time, or based on other criterion.

As stated above with reference to block 104 of FIG. 11, the cost or estimated cost of Phase 1 or Phase 2 can be determined or not. If the cost or estimated cost of a particular phase is determined, it can be determined manually by the party or personnel at an update center, for example, or automatically (e.g., by the processor 28 at the system 20). The cost associated with Phase 1 can depend on the wireline or wireless transmission system used for Phase 1. The system 20 can be configured with data relating to a Phase 1 wireline or wireless transmission system(s) (e.g., Phase 1 data stored in memory 30 or the database 32) and program code which is used in conjunction with file delivery or transfer request data (e.g., one or more of file size, number of recipients, estimated bandwidth required, phase modality, number of rebroadcasts in Phase 1 or pushes in Phase 3, and so on) to automatically determine cost or estimate cost to send a designated file to a target population of user devices in one or more of the Phases 1, 2 or 3.

The determination of when to commence Phase 2 (or Phase 3) after a broadcast of a selected file in Phase 1 illustrated as block 104 in FIG. 11 can be exemplified by first considering a lowest cost distribution method to deliver a file to a selected population of recipients, and then providing the party requesting the file delivery with options for use of more expensive methods of distribution depending on time constraints (e.g., delivery deadlines, deadlines for completing updates, and so on), file size, budget requirements, number of target user devices, among other factors. For example, the lowest cost distribution option can be a broadcast of the file parts or pieces 14 via RFD in Phase 1 for a selected period of time and without employing a Phase 2 method of transmission or modality. Incrementally expensive options are to configure one or more thresholds for entering Phase 2 when the thresholds are met (e.g., after 95% of target user devices 26 indicate a complete update, then use Phase 2 2-way delivery for sending parts or pieces of the file to the remaining targets). As stated above, the threshold(s) can be based on different criteria such as, but not limited to, the number of target user devices or recipients, the size of file to be delivered, the current status of the targets (e.g., as determined by the processor 28 using data that is received from user devices and stored in the database 32), the cost of doing a re-transmission of the file 12 or its parts 14 via a different distribution method or modality.

In accordance with aspects of the present invention, the illustrative lowest cost distribution method has the disadvantage of not allowing the system 20 or party (e.g., file delivery campaign requester) to know which of the intended recipient population 26 received the file 12 or not. One option for this lowest cost distribution method is to broadcast the file parts 14 with a message that instructs the recipients 26 to contact a service center (e.g., an update center 20) if the broadcast(s) in Phase 1 do not successfully deliver the entire file 12 to the recipients' user devices 26. On the other hand, the incrementally expensive options realize a number of advantages such as certainty and flexibility to trade speed versus cost to send files to many users. That is, if cost is most essential, use Phase 2 "late" (e.g., after a significant time period or retransmissions in Phase 1), whereas if speed is important, then start Phase 2 earlier in the file delivery campaign. Either way, the use of broadcast Phase 1 before Phase 2 (2-way communication) saves money when sending the same file (or set of selected files for updating) 12 to many users 26, especially when the file is relatively large and the users are located throughout a large geographic area. In accordance with an advantageous aspect of the present invention, varying degrees of certainty can be gained by designating the amount and types of responses that user devices 26 send during the various phases of a file delivery campaign.

The cost benefits and other advantages of a hybrid file delivery system 10 constructed in accordance with illustrative embodiments of the present invention can be exemplified by an illustrative use case whereby a vehicle manufacturer wants to send a file (e.g., a software update) to telematics-enabled vehicles of a particular model and year of manufacture. In this illustrative use case, the file recipient 26 population is known, that is, the manufacturer has records of how many vehicles were produced in a given year for a given model and which versions of particular software was installed in the vehicles when sold. In the past, when a software change occurred, the manufacturer sent recall notices advising last known owners of the vehicles to return to a dealership to receive the software update. This process is expensive and resource intensive given the amount of dealership involvement among other factors, as well as inconvenient to the vehicle owner.

By contrast, the hybrid file delivery system 10 permits the manufacturer to specify automated downloads of updated software to the vehicles remotely using a combination of Phase 1 and Phase 2 transmissions that can be tailored to the speed and cost requirements of the manufacturer. The automated downloads could be implemented by contacting the telematics units in the target vehicles 26 individually, which can be a very expensive option depending on the transmission path used. Alternatively, Phase 1 broadcast or multicast transmission of software updates can be sent to the vehicles in accordance with illustrative embodiments of the present invention. The system 20 then awaits acknowledgements or other responses from the vehicles, which use their telematics units to communicate with the system using cellular communications, for example. The manufacturer and specify that the broadcast be sent several times over, for example, the course of a month and at different times of day to maximize the likelihood that the target vehicles 26 will be in use during broadcast times to receive the transmission(s) with the updates. After Phase 1 has progressed, the system 20 can determine that only a small percentage of the vehicles has not completed the file update and can be reached via direct communication in Phase 2, thereby realizing a cost savings. Further, the system 20 can be used to send messages to the vehicles that can be displayed and/or audibly played by the vehicle user interface such as a reminder to contact an update center to initiate the download or receive instructions as to when the next broadcast will occur (e.g., date and time).

In accordance with another example, the broadcast data may include a date by which the device must complete file reception and decoding (e.g., Target Completion Date). The user device 26 can monitor accumulation rate of broadcast RFD blocks 14, for example, and periodically initiate contact to the hybrid file delivery system 20, if necessary, during the broadcast to supplement additional block acquisition to assure it will have enough blocks to complete decoding by the Target Completion Date. Thus, this example is a variant on the system 20 monitoring delivery progress, whereby the intelligence for proactively supplementing Phase 1 with portions of Phase 2 before the end of Phase 1 is carried in the device 26 rather than in the system 20.

Variations of a Target Completion Date are also possible. For example, Target Completion Date can represent (a) the date on which broadcast (Phase 1) will be terminated, such that (if necessary) additional blocks will need to be acquired from the hybrid file delivery system 20 after that date to complete decoding; or (b) the date by which the file must be decoded; therefore, the client device 26 contacts the cloud in advance of this date to assure it can complete decoding by that date; or (c) the date by which the file must be installed; therefore, the client device 26 contacts the cloud in advance of this date to assure it can complete decoding and installation by that date, among other examples.

Illustrative Methods of User Device 26 Operation

Figure 12:
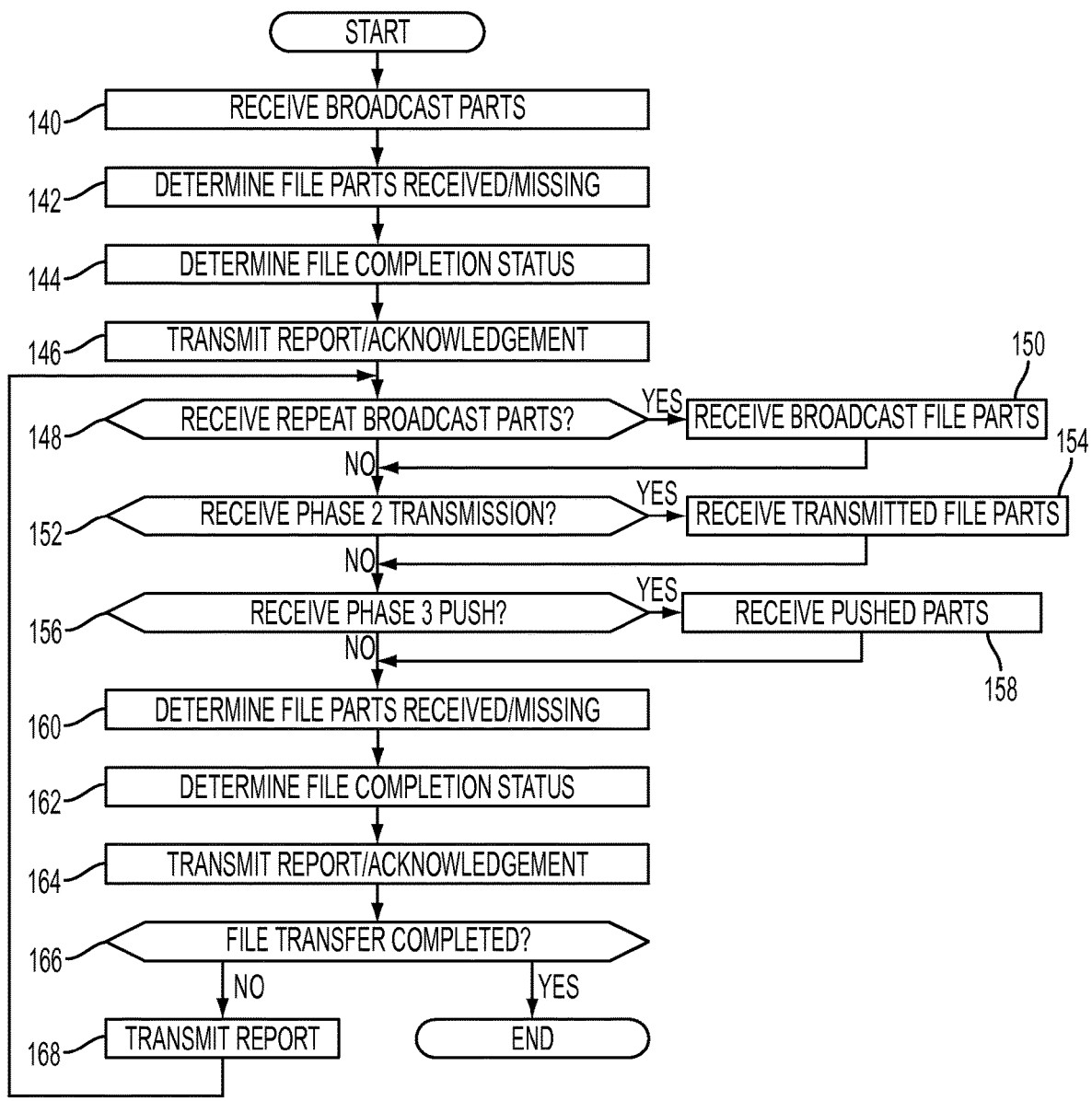
FIG. 12 shows a method for receiving a file and reporting status or requesting missing file parts in accordance with an illustrative embodiment of the present invention.

In accordance with an illustrative embodiment of the present invention, the user device 26 can be configured to perform a number of operations to receive a file 12 from the hybrid file delivery system 20, as shown in FIG. 12 for example. In accordance with illustrative aspects of the present invention, the user device 26 can be configured to receive file parts 14 via at least two transmission modalities (e.g., broadcast/multicast transmission and 2-way, point-to-point transmission), to monitor the progress of receiving the constituent parts 14 of a file (or set of files) 12, to send responses to hybrid file delivery system 20 via the 2-way, point-to-point transmission modality to provide feedback on the status of completing the file transfer or delivery, and to reconstruct the delivered file (or set of files) 12 from the received file parts 14. By way of an example, the system controller 40 of the user device 26 can be programmed via program code that is stored, for example, in a non-volatile memory associated with the user device to perform the operations exemplified using FIG. 12. The user device can be preconfigured or preloaded with the program code. Alternatively, the program code can be sent in a file transfer App that is transmitted with one or more of the file parts, or as a separate transmission (e.g., the App can be broadcast or streamed via IP-connectivity, among other delivery methods), and then stored in a memory of the user device.

With reference to block 140 in FIG. 12, the user device 26 receives file parts 14 (e.g., via at least one broadcast receiver 46) that have been broadcast or multicast from the hybrid file delivery system 20 (e.g., during Phase 1) and stores the file parts 14 in the memory 42. The user device 26 is configured to determine which parts 14 of the file 12 have been received and/or, conversely, which file parts 14 are missing, as indicated at block 142. As stated above, the file parts 14 can be associated with identifiers or other metadata to indicate the identified file 12 and which parts 14 they correspond to within the complete file 12. The downloaded App or the received file part 14 can also provide the user device 26 with configuration instructions and/or parameters corresponding to that particular file 12 such as the number and type(s) of responses requested by the party sending the file and other criteria for sending the responses. With reference to block 144, the user device 26 determines the status of file completion using at least the file part 14 metadata, and transmits (block 146) a response to the hybrid file delivery system 20 such as an acknowledgement that the file transfer is complete, or a request for missing file parts, or a report on the status of file completion, depending on the program code and the App.

As stated above in connection with FIGS. 7-11, the hybrid file delivery system 20 transmits the file parts 14 to the user devices 26 in accordance with Phases 1 and 2 and/or 3 as specified for the party sending the file, and the intended user device 26 continues to receive the file parts 14 as indicated at blocks 148, 150, 152, 154, 156 and 158. As indicated in blocks 160, 162 and 164, the user device 26 is configured to continue to determine the file 12 and which of its file parts 14 are missing, to determine the status of file completion, and to transmit responses to the hybrid file delivery system 20 depending on the status of the file transfer and the criterion specified (e.g., by the requesting party) for responses with respect to that file delivery campaign. As stated above, the user device 26 can store local information relating to the device and/or user ID to which the file 12 is addressed or targeted, file part IDs, status of reception/or and status of completion of each file 12 that is addressed to it, as well as criteria for requesting file parts 14 that or missing or reporting status of completion.

FIG. 12 describes the operations of the user device 16 to receive the parts 14 of a particular file 12. It is to be understood that the user device 26 can receive other files (e.g., via Phases 1, 2 and/or 3) and transmit responses in connection with those other files simultaneously. In other words, the user device 26 is configured to receive and monitor completion status and transmit responses in connection with different files 12 in the same or different file delivery campaigns, as well as for the same file 12 transmitted at different times and/or by different modalities, either simultaneously or in another order.

Figure 13:
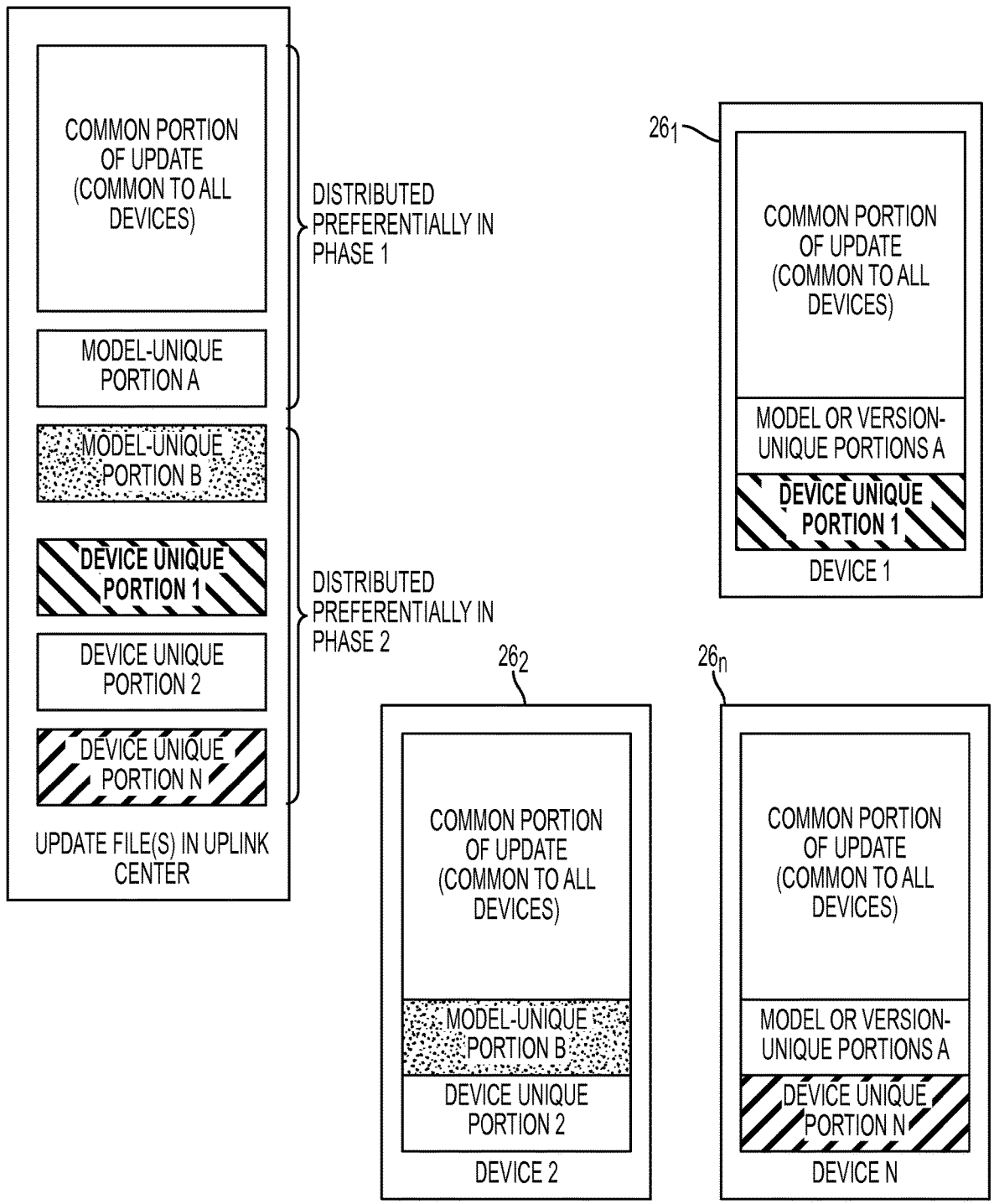
FIG. 13 shows a block diagram of an update center and user devices in a system for file transmission of multiple updates or different files, constructed in accordance with an illustrative embodiment of the present invention.

It is to be understood that multiple updates or different versions of files can be sent using the system 10 as illustrated in FIG. 13. For example, if the Update (or file) 12 is made up of a common set of files or pieces that are shared by all of the user devices 26 in a targeted group (e.g., user devices 26 corresponding to popular models of vehicles), and a smaller set of files or file-pieces are model-specific or even device-specific, the common parts (and, to a lesser extent, the model-specific parts) could be sent in Phase 1 via the broadcast path 50, and the device-specific files (e.g., files perhaps containing keys or information that is keyed to unique devices 26) can be sent in Phase 2 to those individual devices.

Figure 14:
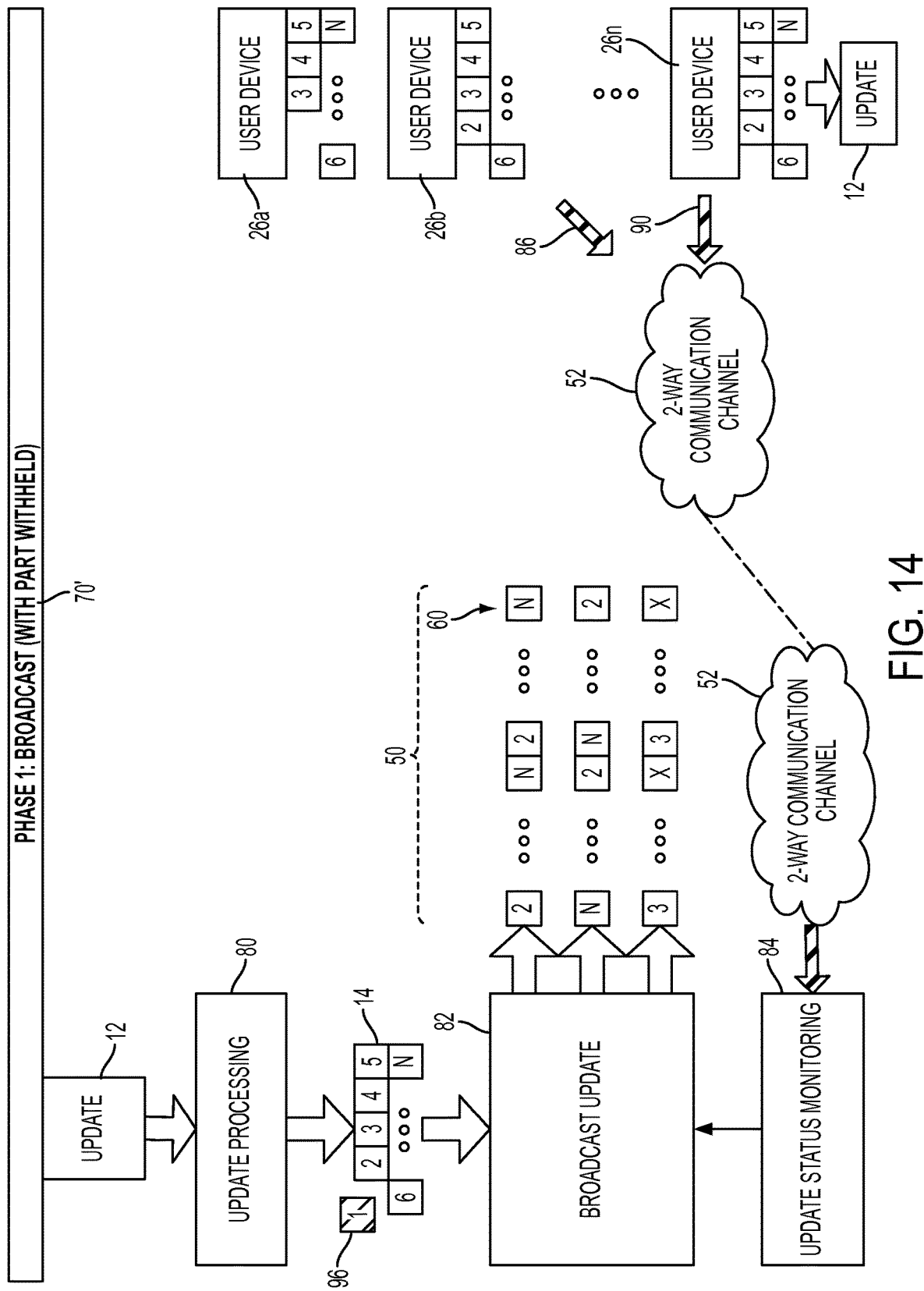
FIG. 14 shows a broadcast phase for file transmission with part of an update, file or plurality of files withheld, in accordance with an illustrative embodiment of the present invention.
Figure 15:
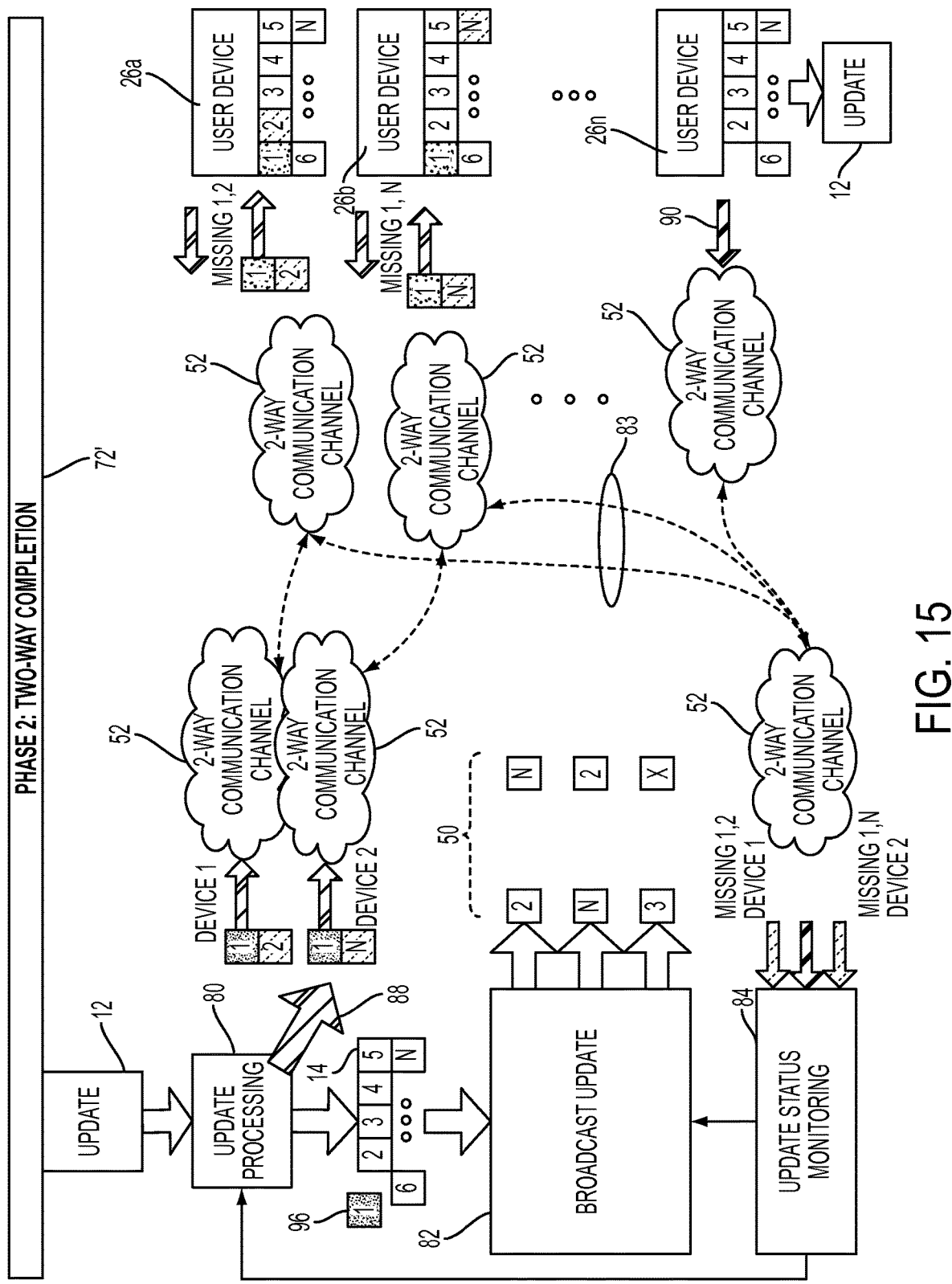
FIG. 15 shows a two-way delivery completion and reporting phase for file transmission with part of an update, file or plurality of files withheld, in accordance with an illustrative embodiment of the present invention.
Figure 16:
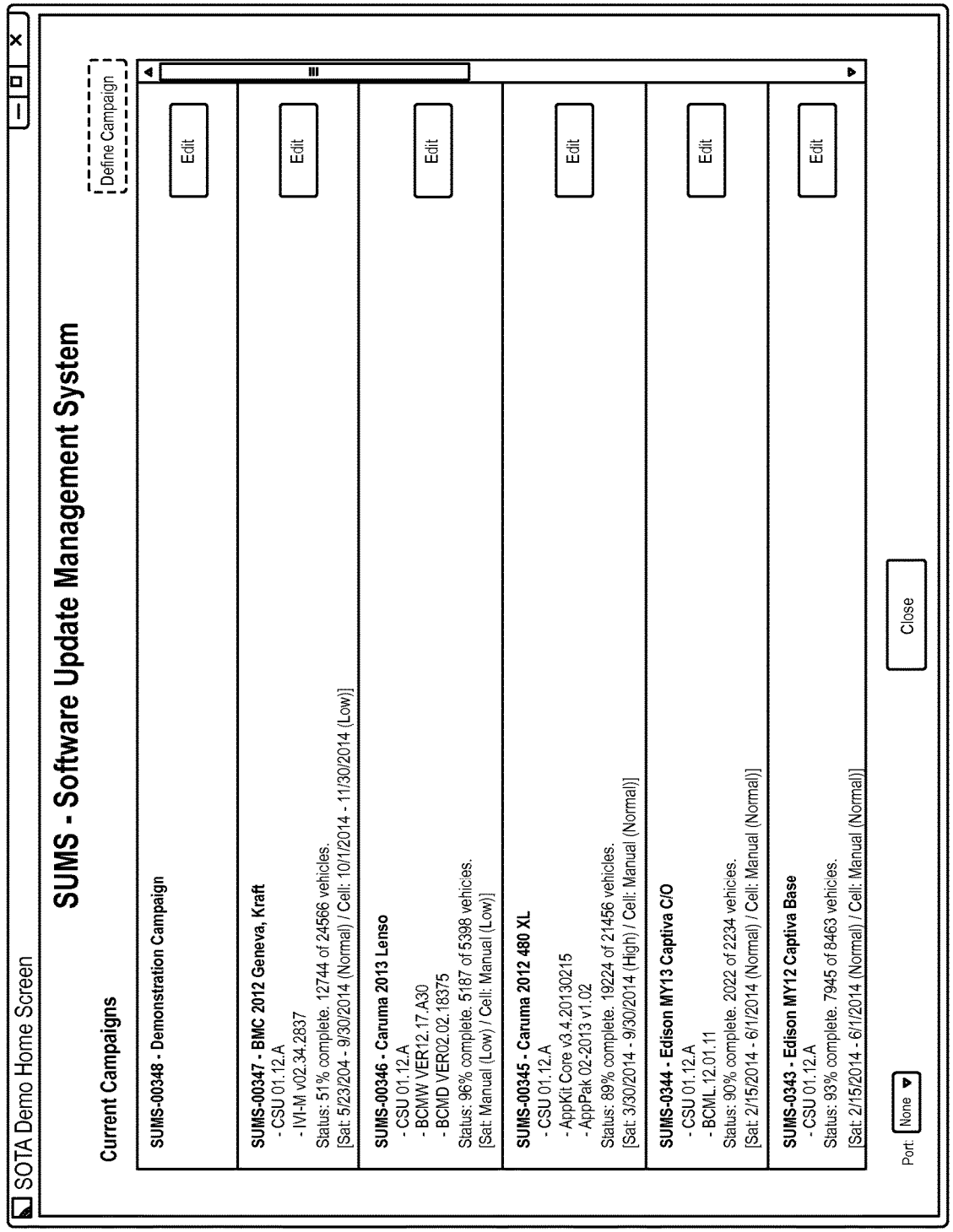
FIG. 16 shows a display indicative of a file delivery campaigns listing screen in a software update management system in accordance with an illustrative embodiment of the present invention.

In addition, as illustrated in FIGS. 14 and 15, the system 20 can be configured to intentionally withhold a part 96 of an update (e.g., file or set of files) 12 from the broadcast (Phase 1), such that the bulk of the data transmission takes place over the broadcast path at low or no-cost (other than bandwidth). The final piece 96 can then be obtained via the 2-way communication path 52 which allows a party, for example, to obtain billing information and charge for the update. For example, the Update 12 can undergo Update processing 80 whereby a file 12 is broken into packets or pieces 14 such that receiving a sufficient number of the packets enables the user device 26 to reconstruct the full Update 12 except for the packet or part that was not transmitted in Phase 1. The withheld part 96 can be a selected one or plurality of the Update parts 14, or can be a key part of the file (e.g., required code for a software update to function or for a file to be decrypted), or can be a selected file among a set of files, and so on. The Update parts 14 are transmitted over at least one broadcast path 50, as shown in FIG. 14. Devices that received the full update except for the withheld packet(s) or part(s) 96 (e.g., devices 26*b* and 26*n* in FIGS. 14 and 15) can send a corresponding acknowledgement to the update center 20. The update center 20 in turn can process requests from mobile devices for missing parts 14 and can charge customers for the update and trigger the transmission of the intentionally withheld part 96, as well as any other missing parts 14.

In this way, all the users (and only those users) that desire or request the update (e.g., take some action to complete the update) will make use of the 2-way communication path 52. The fact that a party is charging something for an update will justify the cost of the transmission of the remaining part or parts of the update, that is, the part withheld from the broadcast and any other part or part(s) that may have been missed in addition to the withheld part(s) 96. Thus, the system 10 can be used advantageously to control distribution costs of updates.

It is to be understood that the steps depicted in FIGS. 11 and 12 can be performed by the system 20 and the user device 26, respectively, in a different order than shown. For example, the system 20 can be programmed to broadcast file parts and then push selected parts, or select thresholds at the same time or before determining a modality, among other variations.

In accordance with another aspect of illustrative embodiments of the present invention, the update center 20 and the user devices 26 are configured to employ hybrid transport conditional access that targets broadcast files 12 and messages to a selected group of users or user devices 26. For example, a user device 26 can track when its receiver(s) (e.g., broadcast receiver 46) is on and report this information and optionally other information about the user such as content and program channel likes and dislikes (e.g., through stored channel tuning history), listening times, and biographical/demographic information, to the server or system 20 so that the system 20 can determine when to optimally target that user with updates via a 2-way path 52, or whether a message or file update is applicable to a sufficiently large group of users to make a broadcast via Phase 1 to be cost effective.

Further, addressing for file or update delivery by the system 10 is facilitated by the combination of reporting user information by the user device 26 and storage of the user information by the database 32. For example, storage of VINs and related user information at the database 32 allows the processor 28 to determine a range of target vehicles for a file update 12 and to list the VINs of the target vehicles in a compressed or compact manner (e.g., ranges of VINs compressed into easily parseable fields for improved messaging or file delivery). The ranges or compact lists of VINs of the target user devices 26 can be broadcast with a file update 12 such that only the target user devices 26 with matching VINs will store the file update, whereas the non-matching user devices will ignore the broadcast and not store the transmitted file 12 or file parts 14. An illustrative method of target user addressing using VINs is exemplified in commonly owned U.S. Patent Application Publication No. 2008/0287092, which is incorporated by reference herein. In addition, the broadcast can have an embedded date or other information with which to direct user devices 26 on when to give feedback (e.g., if file delivery completion status is not x % by x date/time, then go retrieve the file parts 14 or request that they be sent via a 2-way path 52.

Alternatively, the user devices 26 can be configured to receive an IP message directed to a group of devices 26 based on the addressing, wherein the IP message instructs the targeted user devices 26 to turn on and receive files parts 14 with a selected header (e.g., containing an applicable VIN or VIN range). Thus, the update center 20 can instruct user devices 26 that they are part of a designated group (e.g., identified by a header of transmitted packets). Further, target user instructions to retrieve missing file parts 14 need not be embedded in a broadcast but rather the targeted user is contacted directly via IP multicast.

Similar to VINs, the database 32 can stored radio identifiers (RIDs) for devices subject to a subscription for broadcast programming which can be used, along with other stored user information, by the processor 28 to generate lists of RIDs with grouping or enumerated modes, or sequential lists for conditional access on satellite radios to perform an file update 12.

Illustrative File Delivery Options

In accordance with illustrative embodiments of the present invention, the hybrid file delivery system 20 does not need to explicitly track which devices 26 have received a given file 12, and/or allow for deferred reception of an entire file 12 until it is actually needed by a particular device 26, and/or allow for avoiding full delivery of a file 12 that is never actually needed:

To reduce the number of necessary 2-way communications between the target user devices 26 and the hybrid file delivery system 20, the target user devices 26 do not initiate contact with the hybrid file delivery system 20 to report successful file receipt, nor does the hybrid file delivery system 20 initiate contact to the target user devices 26 to query if the file was fully received. Instead, the target user device 26 and hybrid file delivery system 20 defer communications related to the success of file delivery until a user or target user device operation ("device application operation") triggers a need for the file. At that time, if the file has been successfully delivered, the device application operation proceeds. However, if the file has not been received (either only partially received or no portions received at all), the target user device 26 requests the delivery of the file 12 from the hybrid file delivery system 20 in a one-to-one transmission. If no device application operation requiring a given file is initiated for a particular target user device, the file may thus never be needed, so no one-to-one communication resources are wasted to deliver the file to that target user device.

This method is more efficient for delivering content for which there is no compelling need for the hybrid file delivery system 20 to have full knowledge of which specific devices have received the file at a given time. Thus, the hybrid file delivery system 20 does not need to maintain a database 32 related to the files sent and the responses received; this status is effectively known collectively by the individual target user devices 26. Though a centralized database of file reception status 32 may be important for regulatory or critical file deliveries, it may be unnecessary overhead for files such as apps or app data that may or may not be used by a particular user, navigation POI databases for a region never entered by a particular user, etc.

In accordance with another aspect of the present invention, user devices 26 may leverage 2-way contacts to the system 20 that are required for purposes other than file reception and tracking such as to report progress, get more blocks, etc. to beneficially reduce quantity of individual communications sessions, and to help avoid situations where a communications session is required in the future to complete block reception or report progress but no 2-way connection can be established.

Illustrative Use Case for Other-the-Air Vehicle Software Update Service

For illustrative purposes, the hybrid file delivery system 20 and the user devices 26 are exemplified by a system that performs over-the-air vehicle software update service, which combines delivery over a broadcast system (e.g., a satellite broadcast system) with delivery and confirmation using cellular connectivity. The system 10 securely updates software in many thousands of driving vehicles over a period of a few weeks, minimizes wireless delivery costs, which could be substantial when using only one-to-one cellular-based delivery, and maintains records of which vehicles have received and installed the updates during and following the update campaigns. By way of an example, update file delivery can be achieved using the satellite system operated by SiriusXM Radio, Inc., which supports extremely efficient 1-to-many broadcast of data files. A cellular network, which supports 1-to-1 delivery of files, is also used for update file delivery, as well as provides a back channel that can be useful for confirming update delivery and installation.

Figure 26:
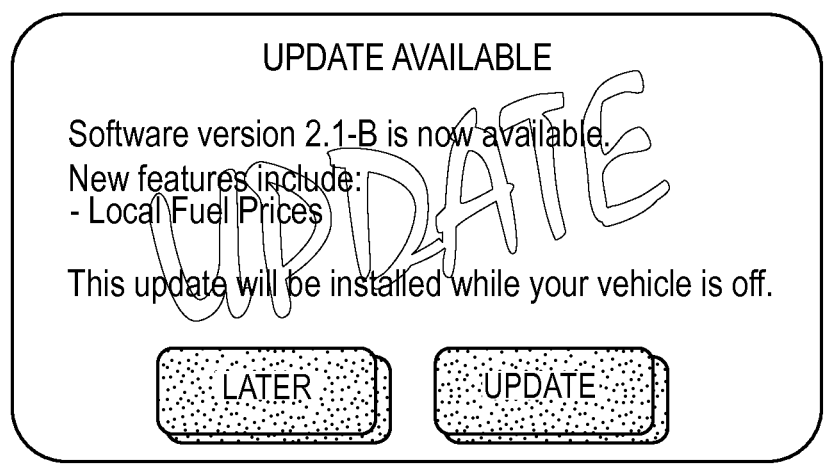
FIG. 26 and FIG. 27 each show a display indicative of an update screen of a user device in accordance with an illustrative embodiment of the present invention.
Figure 27:
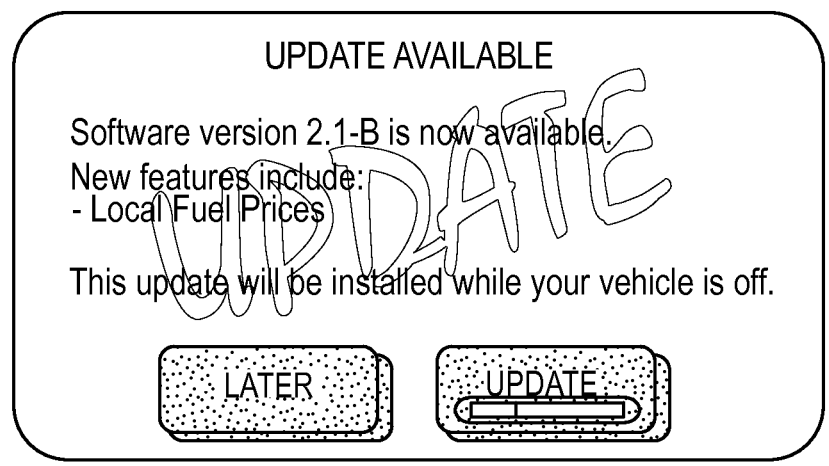

The user devices 26 can be, for example, target vehicles with telematics control units (TCUs) which can be operable with satellite and cellular receiver hardware and software, or other connected services unit (CSU) that integrates satellite and cellular connectivity in one cost-effective module. The user device 26 can be configured to generate screens (e.g., screens as depicted in FIGS. 26 and 27) on a display 44 or on a display of one or more of the data devices 27, that indicate when updates 12 are available and status of their delivery (e.g., FIG. 27), as well as user interface buttons to allow a user to install a completely received update now or later.

As described by way of an example below, the system 20 can comprise or operate in conjunction with a Delta Generator, a software update management system (SUMS) and an encoder. The Delta Generator is configured to generate compressed update image files. The SUMS is an application, for example, that can be used in conjunction with the processor 28 and the back office (BO) console 34 to define, initiate, and report the update campaigns. The encoder is configured to optimize files for 1-to-many broadcast delivery and examples of coding schemes are provided above. The Delta Generator and the encoder can be part of or separate from the system 20.

For an example update campaign, a party wishes to update an IVI to add a new user-visible feature, update the Connected Services Unit firmware, and update the Transmission Control Unit to deploy an emissions optimization, for a target group of user devices 26 in about 50,000 vehicles that incorporate these shared components. The illustrative campaign has two phases. First, an efficient satellite system delivers these updates 12 to most vehicles. Second, a cellular system delivers the updates 12 to the small percentage of vehicles that did not get the full updates over the satellite system (e.g., due to very low drive time during the satellite phase).

Delta images are created for each of the desired updates by using the Delta Generator software. This software analyzes the new software binary with an older version, creating a delta file which is usually substantially smaller than the full binary file. Since it is common to have multiple versions of a software component installed in vehicles in the field, a delta image is created against each older version that might be in a vehicle, to create a set of delta images that can bring any of the older versions up to the newest version.

Creation of delta images is typically performed by the OEM or by a Tier 1 on behalf of the OEM. The system 20 can have secure access to the Delta Generator server, and therefore never needs direct access to the original software images, which remain securely in the control of the OEM or their designated Tier 1. Once the delta images are created, they are securely uploaded into the system 20 operating with the SUMS (hereinafter referred to as the SUMS system). At this point, the campaign is defined using the SUMS system by indicating which vehicles are to be targeted, which delta images are to be sent, and when the campaign is to be executed.

For example, an SUMS console application can generate a screen (e.g., FIG. 16) to display a number of update campaigns in progress. Once the update delta files for a new campaign have been uploaded to the SUMS repository (e.g., database 32 or separate database), the new campaign can be defined. For example, the SUMS application can be used by the processor 28 to generate a screen (e.g., FIG. 17) on the BO console 34 such as a "Campaign Definition" screen that provides options to define the three main components of a new campaign: selecting the target vehicles, selecting which components a party (e.g., OEM) wants to update with new software, and specifying the schedule for the update campaign.

Figure 23:
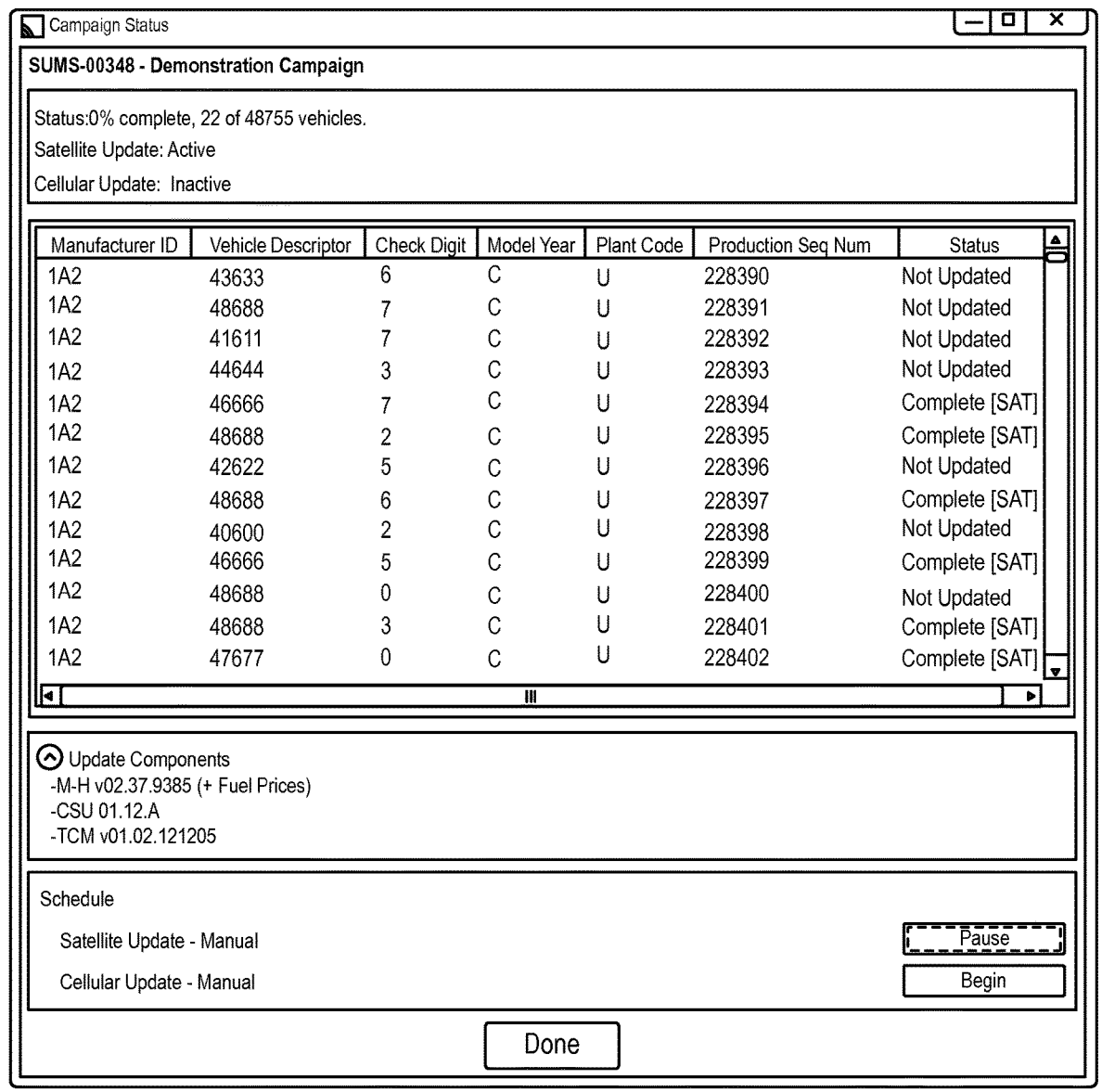
FIG. 23 shows a display indicative of a campaign status screen in a software update management system in accordance with an illustrative embodiment of the present invention.
Figure 24:
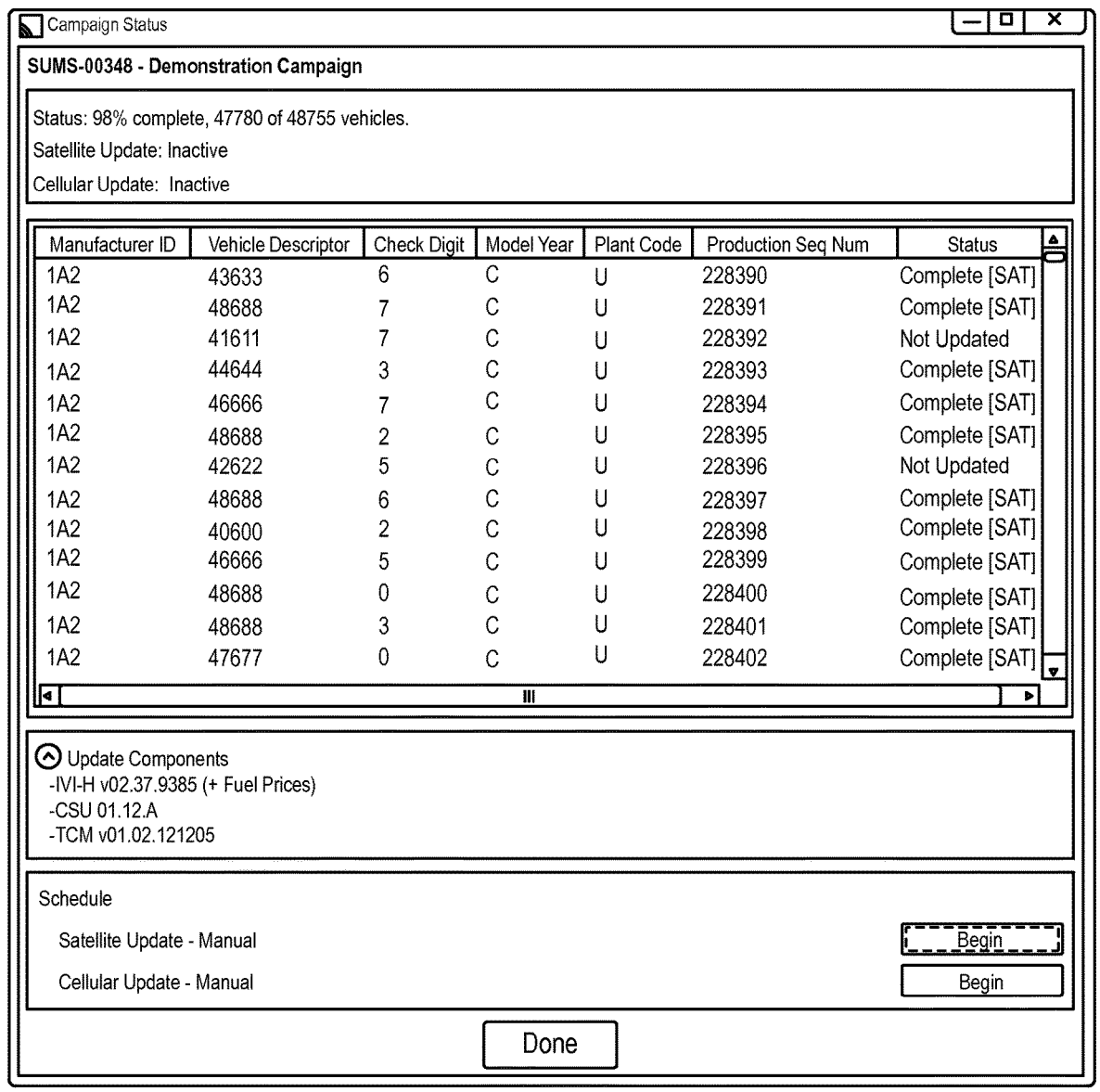
FIG. 24 and FIG. 25 each show a display indicative of a subsequent campaign status screen in a software update management system in accordance with an illustrative embodiment of the present invention.
Figure 25:
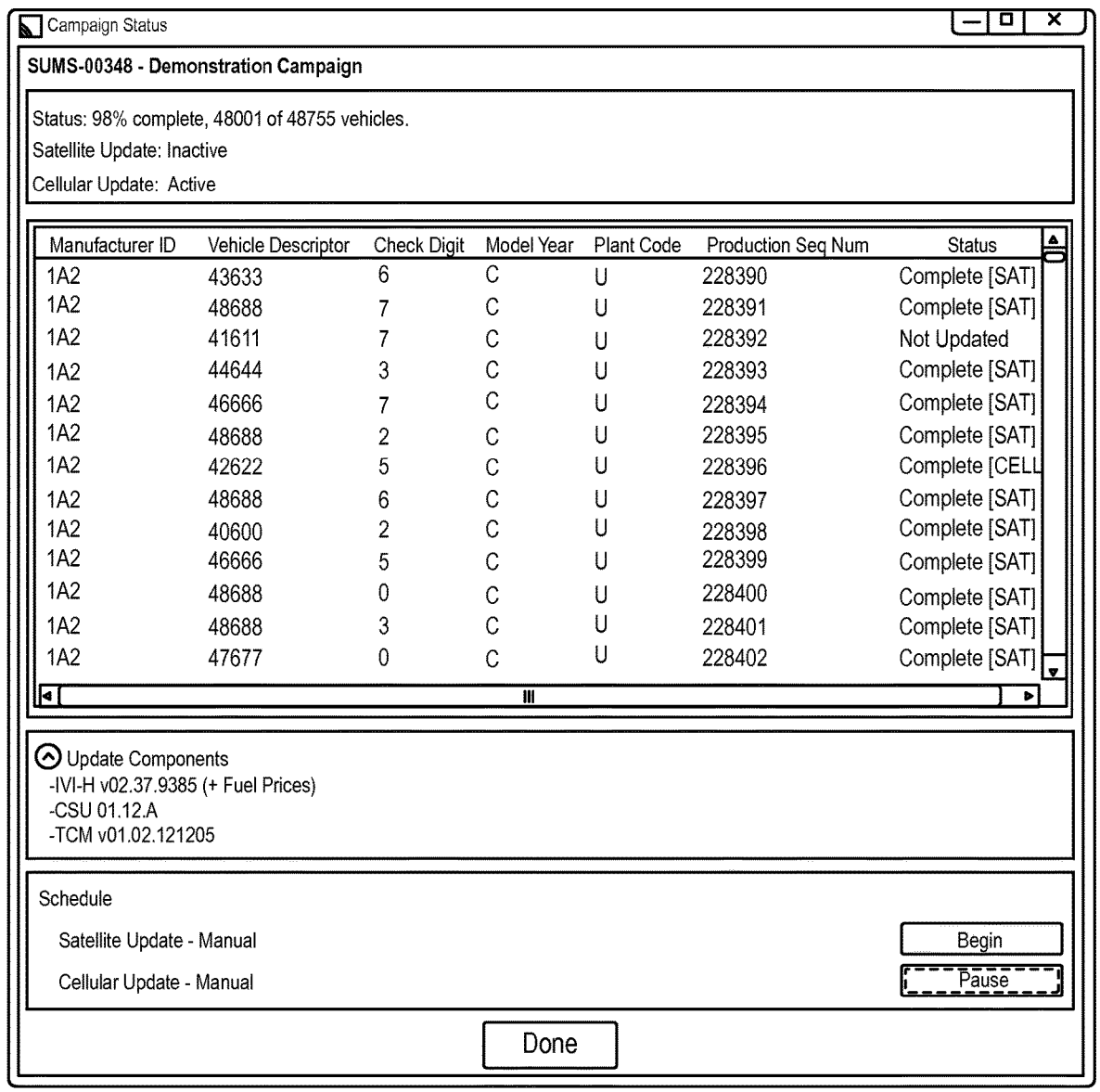

The console 34 can, for example, generate and display a "Select Target Vehicles" screen or window (e.g., FIG. 18) providing one or more ways by which a party can select target vehicles. An ongoing data exchange can occur between the OEM and the SUMS system to maintain a database of potential target vehicles (e.g., in the database 32). The most direct option for selecting the targets is using a specific VIN list, which the OEM uploads into the database 32 via the SUMS system. Another option can be by selecting the software components to be updated, and letting the SUMS system analyze the database to determine which vehicles include those components and are therefore in the target population. Another option is to specify a VIN range. For example, an operator can enter various VIN subfield definitions, using ranges, wild cards and other tools to select the targets into a "VIN Input" screen or window (e.g., FIG. 19). For example, an operator can specify a manufacturer ID. The SUMS system can analyze its database and identify a list of cars that match the VIN criteria, as illustrated in FIG. 20. The operator can optionally identify which updatable software components to include in the new campaign using, for example, a "Select Update Components" window option (e.g., FIGS. 17 and 18). The SUMS determines which updates can be applied to these identified vehicles based on the database. For example, the operator can select the IVI update, the CSU update, and the TCU update, as shown in FIG. 23.

Figure 21:
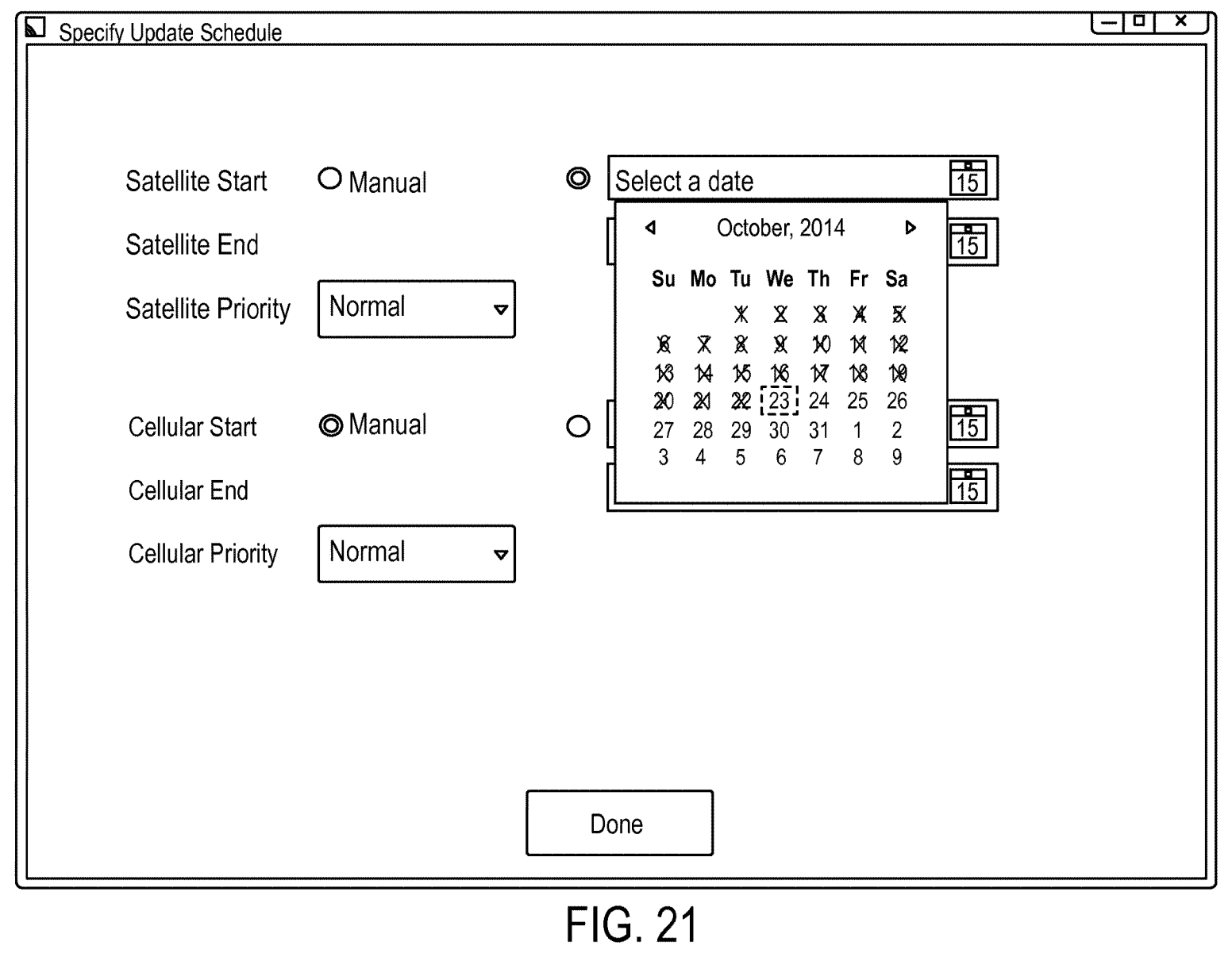

Next, an operator can indicate when and for how long the requesting party wants to the new campaign to run using, for example, a "Specify Schedule" screen or window (e.g., FIG. 21). The operator can separately establish when the satellite broadcast phase of the update campaign is to start and end (e.g., by selecting dates on a calendar popup), and the same for the cellular 1-to-1 phase of the campaign. Other screen inputs (not shown) can guide a user to indicate other criteria for starting and ending Phase 1 (i.e., broadcast) and Phase 2 (i.e., cellular 1-to-1 delivery) of a campaign such as user responses at designated times or percentages of file delivery completion, number of broadcast retransmissions, and Phase 2 commencement criteria based on number of responding users and/or reporting of designated percentages of file delivery status.

A "Campaign Status" screen (e.g., FIG. 23) can be generated by the console 34 to allow an operator and/or the requesting party to see details of the campaign progress such as listings of target VINs and indications of whether or not they are Updated. The Campaign Status screen can be refreshed throughout the campaign (e.g., FIGS. 24 and 25).

Upon initiating the satellite delivery phase (i.e., Phase 1) of the campaign, the SUMS system forwards the delta images to the satellite uplink, along with metadata about the images and addressing information identifying the target vehicles for broadcast. The delta image files are also encoded (e.g., by an RFD server or other encoder) into a series of unique data blocks 14 that can be accumulated, reassembled and decoded by companion RFD or other encoding software in the vehicles. A subset of the RFD or encoded blocks are also archived in the SUMS system for use later in the cellular delivery phase (i.e., Phase 2).

As the satellite transmission of the update data proceeds (e.g., periodically or continuously) during the satellite delivery phase of the campaign, and as vehicles are driven during these transmission times, only targeted vehicles will process the received RFD or encoded blocks. Multiple levels of security can also be provided, including the inherent high security of a closed proprietary satellite system and authentications controlling which vehicle satellite receivers can process the updates. Moreover, the OEM or Tier 1 can optionally add further security by wrapping the delta image files in their own encryption layers. Since the system 20 is just delivering binary files by way of a broadcast system on behalf of the OEM, there is no issue with adding more encryption or obfuscation.

Satellite delivery is very efficient, as a 1-to-many broadcast system. Once the proper bandwidth allocation for the update files is established, there is no difference in sending the updates to 1,000 versus 100,000 vehicles. It may take the target vehicles multiple driving periods to completely receive the updates; that is, the more a vehicle is driven, the faster it will receive the updates.

As each vehicle completely receives and successfully installs the updates 12, it uses the cellular system to connect to the SUMS system and report its success. This can be a very brief cellular transaction, using negligible cellular data bandwidth. One or more screens or windows can be generated by the SUMS system via the operator console 34 to allow an operator or party to see file delivery progress (e.g., how many target vehicles have received and installed the updates). For example, after a couple of weeks, an operator may receive update confirmation from nearly all the targeted vehicles; however, there will always be some small percentage of vehicles that simply are not driven enough to accumulate all the update data necessary during the period of the satellite campaign. At this point, the satellite phase of the campaign can end, and the cellular phase of the campaign can start, as an example. As stated above, Phase 1 and Phase 2 can also overlap.

Regarding the cellular delivery phase of the campaign, the SUMS system maintains a list of the target vehicles and installation confirmations, and therefore knows which vehicles still need the updates. The SUMS system can then attempt to establish a cellular contact with each one of these remaining vehicles. When contact is established, it sends one or more of the updates 12 or parts 14 thereof to the vehicle as a 1-to-1 cellular data transaction. For those vehicles that have already received some of the satellite RFD blocks, it need only send the number of additional blocks required to complete the updates using the aforementioned cached RFD blocks. This further reduces cellular data bandwidth use and increases transaction speed. The "Campaign Status" screen on the operator console 34, in turn, indicates confirmations from cellular delivery (e.g., FIGS. 23-25), which have been added to a refreshed list of VINs and update status. When the cellular phase of the campaign is complete, nearly all vehicles will be updated. It is always possible a small number of vehicles will not be updated if they are never powered on during the campaign or have been scrapped. However, the SUMS system can list this small number of vehicles so they can be investigated further (e.g., the registered owner can be mailed a notice to visit a dealership).

Throughout the campaign, the OEM has access to the SUMS status and reports, so they can be aware of progress at all times. Final reports may also be useful for documenting campaign completions for internal and regulatory purposes, with potential acceptance by governing agencies.

2-Way Communication (Phase 1) and Broadcast (Phase 2)

In the above illustrative examples, broadcasts to a target population of user devices 26 in a Phase 1 was followed by 2-way communications to selected user devices in a Phase 2. These examples were particularly useful with mobile user devices 26 (e.g., that are not in WiFi range) such as telematics-enabled vehicles or smart phones. In other situations, the system 10 can be configured to employ 2-way communications during a Phase 1, and determine when to employ broadcast communications to a population of target devices during a Phase 2.

For example, the user devices 26 can be an internet-connected home device such as a set-top box or security system that can have both RF and internet or IP connectivity (e.g., WiFi). Such devices can generally use an IP link for software updates; however, the system 10 and methods in accordance with illustrative embodiments of the present invention can be used to determine when software updates over the radio or RF link is preferred over the IP link. For example, an update center or file sender 20 can require a message back on file delivery status completion, and base RF link transmission of updates on the number of user devices, the size of the file to be delivered and/or the time constraints of a file update are such that a broadcast is deemed to be cost effective (e.g., in the situation where the server is not expected to be able to handle the traffic volume needed to effect a desired update).

For example, the user devices 26 can be configured to transparently obtain access to files 12 (e.g., as web objects) from a client application running on the user device. The client app can be a Web App running on the user device, which also has a satellite receiver or other receiver 46. In its normal course of operation, the Web App uses Web/Internet protocols to access data that normally resides on a remote server (e.g., over a cellular network). The Web/Internet protocols can be, for example, internet caching protocols that support transparent access (i.e., with respect to the Web App) to web objects that have been cached locally on an end device (e.g., perhaps cached due to recent access to the same web object) such as Internet Cache Protocol or Hypertext caching protocol, or any other protocols whereby the remote server redirects the client Web App to first try accessing a web object from a local server (e.g. a local host SDARSs server). One of these local caches can be a Broadcast Download Server (e.g., an SDARS server controlling an SDARS receiver 46 running on the same device 26). The priority of attempting access to the web object can be from:
1. A lowest level cache
2. The Broadcast Download Server cache
3. The remote server (i.e. object is not cached).

In some cases, the Web App runs on one web device, the Broadcast Download Server runs on a another web device, each on an inexpensive local network (e.g. WiFi). By way of a Router, data communication between the Web App and the Broadcast Download Server occurs locally over the local network, and between the Web App and the remote server over the more expensive cellular network. In some cases, the Router is implemented on the same device as the Web App or the same device as the Broadcast Download Server, and the Router connects to WiFi and cellular.

Another aspect is that the remote server can monitor access to web objects across all wireless clients and, based on expense algorithm, request an Uplink Broadcast Server (e.g., an SDARS server) to broadcast that object (or the next version(s)s of the object), targeting a select group of client user devices 26.

In accordance with an illustrative embodiment of the present invention, the hybrid file delivery system can be used to send a file 12 that is a database, containing individual records. Over the broadcast network 50, instead of transmitting fixed length file pieces that make up the file, variable length pieces representing individual records (or groups of records) of the database are transmitted. Each individual record by itself (even before reception of the entire file) is useful to the use device 26 application.

In requesting a record from the database (e.g., querying the database), the user device 26 application first queries a broadcast delivered database (e.g., a local broadcast server may manage the broadcast delivered database and handle queries from the application). If the broadcast delivered database does not as of yet contain the requested record (e.g., it has not yet been received), the application queries the record from a remote server over the 2-way network. The remote server transmits only the record(s) requested, not the entire database file. In addition to using the supplied records (e.g. presenting some information to the user), the application may also provide the records to the broadcast delivered database for insertion into the broadcast delivered database (so as the build the broadcast delivered database more quickly).

To simplify the application implementation, the application can instead only request records by queries to a single local proxy database server. This local proxy server then manages all the details described above related to obtaining the records either from the local broadcast server or the remote server on the 2-way network.

Illustrative Use Case for Phase 1 (Satellite) and Phase 2 (Cellular): Gap Filling A major application of cellular data networks is the transmission of text messages and data messages to mobile devices of various types, including telematics modules embedded in vehicles. Cellular data networks have gaps in coverage ranging from small local gaps (e.g., gaps caused by tunnels or building shadows impacting signal reception, and cell tower failures) to large gaps in coverage (e.g., where the population density does not justify the expense of erecting cell towers) that can prevent immediate delivery of text or data messages. Accordingly, existing cellular service systems store undeliverable messages when target mobile devices are in coverage gaps, and then deliver those messages when the mobile devices return to the coverage area.

In accordance with an alternative illustrative embodiment of the present invention, the system 10 can provide an improved text and data message delivery system that can immediately deliver messages even though the intended recipient mobile device is located in a cellular coverage gap. For example, the hybrid file delivery system 20 can be configured to send messages to mobile devices 26 in a cellular coverage gap. The hybrid file delivery system 20 can be provided with a central delivery controller (CDC), or associated with an external CDC, that is operable to recognize when the target mobile user device 26 is not within the cellular coverage area. Each message has a unique tag or identification number associated with it. The mobile user device has a controller (e.g, system controller 40) which controls a satellite receiver 46 and a cellular modem 48 and accepts messages from either the cellular network or the digital satellite broadcast network.

When in cellular coverage, the mobile user device 26 acknowledges receipt of messages using a 2-way communication path 52 (e.g., a transceiver 48 such as a cellular modem). When out of cellular coverage, the mobile device 26 stores unique message identifiers received via broadcast from the hybrid file delivery system 20 (e.g., in conjunction with a satellite network) and transmits acknowledgements for them via the cellular network when it returns to cellular coverage. The hybrid file delivery system 20 can maintain message status in the database 32 and be configured to not re-transmit the messages via the cellular network until it receives a message from the mobile user device 26 that indicates whether or not some or all of the messages have already been received via the digital broadcast satellite transmission while the target receiver was out of cellular network coverage. After receiving information from the target mobile user device 26, the hybrid file delivery system 20 selectively retransmits only those messages that the target mobile user device has not already received (e.g., within selected time period).

The advantages of this illustrative embodiment of the present invention are that users receive messages in a more timely and reliable fashion when in areas with poor cellular network coverage. Further, the need to retransmit messages is reduced. Messages which may be related to safety and security (e.g. "door unlock" or "engine shut down") may be delivered via the broadcast path 50 with higher coverage reliability than the cellular network alone.

One or more processors 28 and controllers 40 can control the various components of the system 20 and user devices 26, respectively. The processing of the disclosed systems and methods can be performed by software components. The disclosed system and method can be described in the general context of computer-executable instructions, such as program modules, being executed by one or more computers or other devices. Generally, program modules comprise computer code, routines, programs, objects, components, data structures, etc. that perform particular tasks or implement particular abstract data types. The processor 28 and controllers 40 can be coupled to removable/non-removable, volatile/non-volatile computer storage media. By way of example, FIG. 2 illustrates memory 30 coupled to the processor 28 which can provide non-volatile storage of computer code, computer readable instructions, data structures, program modules, and other data for the system 20. As an example that is not meant to be limiting, memory 30 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like. Similarly, the controller 40 in a user device 26 can be provided with non-volatile storage of computer code, computer readable instructions, data structures, program modules, and other data in a separate memory (not shown) or as part of the system controller 40 or in the storage device 42. The user devices 26 can be provided with complete files or updates 12 or their parts 14 for storage in a memory 42 (e.g., volatile memory, or a read only memory (ROM) or other non-volatile memory) associated with the receiving device (e.g., internal to the receiving device, or external to the receiving device and capable of being coupled thereto). The files or file parts can be provided on a removable digital storage medium (e.g., a flash memory device such as USB thumbdrive or micro SD, SDHC or SDXC card) from which the user device 26 is capable of accessing the files and other data, code or instructions for accessing or otherwise monitoring the stored update files 12 or file parts 14.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

The database 32 can be any of one or more databases known in the art. Examples of such databases comprise, DB2®, Microsoft® Access, Microsoft® SQL Server, Oracle®, mySQL, PostgreSQL, and the like. The database 112 can be centralized or distributed across multiple systems.

Illustrative embodiments of the present invention have been described with reference to operations at a hybrid content delivery system or user device. It is to be understood, however, that the present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, DVDs, magnetic tapes, floppy disks, optical data storage devices. It is envisioned that aspects of the present invention can be embodied as carrier waves (such as data transmission through the Internet via wired or wireless transmission paths). The computer-readable recording medium can also be distributed over network-coupled computer systems so that the computer-readable code is stored and executed in a distributed fashion. Also, functional programs, codes, and code segments for accomplishing the present invention can be easily construed as within the scope of the invention by programmers skilled in the art to which the present invention pertains.

While the invention herein disclosed has been described by means of specific embodiments and applications thereof, numerous modifications and variations can be made thereto by those skilled in the art without departing from the scope of the invention.

What is claimed is:

1. A method of delivering files to user devices using plural transmission phases and hybrid distribution modes comprising:
designating a plurality of user devices targeted to receive a file;
preparing the file to be transmitted to the targeted user devices by processing the file to obtain a plurality of file parts that can be used to reassemble the file, the file parts include a first set of file parts and a second set of file parts not included in the first set;
transmitting the first set of file parts in a first transmission phase using a first transmission mode that employs a one-to-many, one-way communication channel, while withholding the second set of file parts to be transmitted at a later time;
storing information comprising an identifier corresponding to the file or its delivery instance;
receiving, via a two-way communication channel, communications from a subset of the targeted user devices indicative of at least one of a request for missing file parts of the first set of file parts and of how many of the first set of file parts have not been received by the corresponding targeted user device;
updating the stored information by storing information relating to at least each of the targeted user devices for which communications were received via the two-way communication channel, the updated information indicating how many of the file parts have been received at each of the targeted user devices based on the received communications; and
transmitting, to one or more of the subset of the targeted user devices and based on the updated stored information, the missing file parts of the first set of file parts in a second transmission phase using a second transmission mode that employs one-to-one communication, via the two-way communication channel.

2. The method of claim 1, wherein the storing comprises storing information for each of the designated user devices, and wherein the one-to-many, one-way communication channel includes a broadcast channel.

3. The method of claim 1, wherein the designating comprises at least one of entering identifiers for each of the targeted user devices, and entering other user criteria with which a database of user information can be searched to identify each of the targeted user devices.

4. The method of claim 1, wherein the designating comprises transmitting user specifications to a plurality of user devices via the first transmission mode, and further comprising operating the user devices to determine if they are a designated targeted user based on the user transmitted specifications.

5. The method of claim 1, further comprising determining when to transmit using the second transmission phase based on a selected number of the subset of the targeted user devices having failed to receive a selected percentage of the file during the first transmission phase as indicated by the stored updated information.

6. The method of claim 1, further comprising commencing transmission of the second set of file parts using the one-way communication channel after a specified percentage of the targeted user devices have indicated that they have received the first set of files completely via the one-way communication channel.

7. The method of claim 1, wherein the storing information further comprises storing criteria for when to transmit using the second transmission phase.

8. The method of claim 7, wherein the criteria comprises at least one of a selected number of the targeted user devices that failed to completely receive the first set of file parts during the first transmission phase, a selected time period after commencement of the first transmission phase, a selected number of broadcast or multicast retransmissions during the first transmission phase, and a selected portion of the file that has yet to be transmitted during the first transmission phase.

9. The method of claim 1, further comprising configuring the user devices to transmit interim status updates at predetermined time intervals after commencement of the first transmission phase, or after different selected percentages of the file have been received.

10. The method of claim 9, wherein the configuring comprises providing the user devices with control data indicating when or how often to perform one operation selected from a group of operations consisting of sending a file delivery acknowledgement, requesting or reporting missing file parts, and reporting status of received incomplete file.

11. The method of claim 1, wherein the file targeted to be received by the designated user devices comprises a set of files to be delivered to each of the target user devices.

12. A system of delivering files to user devices using plural transmission phases and hybrid distribution modes comprising:

at least one communication interface configured to interface with a first transmission system that employs a one-to-many, one-way communication channel to send a file to a plurality of user devices, and a second transmission system that can perform one-to-one communications via a two-way communication channel with respective ones of the plurality of user devices;

a human machine interface configured to receive user inputs specifying a file to be delivered to targeted ones of the plurality of users, the file having been divided into file parts that can be used to reassemble the file;

a memory device for storing information comprising an identifier corresponding to the file or its delivery instance; and a processing device configured to:
transmit a first set of the file parts during a first transmission phase that uses the first transmission system while withholding a second set of file parts not included in the first set;
receive, via the two-way communication channel, communications from a subset of the targeted user devices that include at least one of a request for missing file parts of the first set of file parts and an indication of how many of the first set of file parts have not been received by the corresponding targeted user device;
update the stored information in the memory device with information relating to at least each of the target user devices for which communications were received via the two-way communication channel, wherein the updated stored information indicates how many of the file parts have been received at each of the targeted user devices based on the received communications; and
transmit, to one or more of the subset of the user devices and based on the updated stored information, the missing file parts of the first set of file parts in a second transmission phase using the second transmission system that employs one-to-one communication, via the two-way communication channel.

13. The system of claim 12, wherein the processing device is configured to control the human machine interface to generate display screens or windows to guide a requesting party to identify one or more files to transmit, to select the targeted user devices, and to specify criteria for commencing the second transmission phase after the first transmission phase.

14. The system of claim 13, wherein the memory device is configured to store information corresponding to the file to be transmitted, information about each of the target user devices, and the criteria.

15. The system of claim 13, wherein the criteria stored in the memory device comprises at least one of selected number of the targeted user devices that failed to completely receive the first set of file parts during the first transmission phase, a selected time period after commencement of the first transmission phase, a selected number of broadcast or multicast retransmissions during the first transmission phase, and a selected portion of the file that has yet to be transmitted during the first transmission phase.

16. The system of claim 12, wherein the memory device is configured to store criteria specifying when the targeted user devices are to transmit their communications, the criteria configuring the targeted user devices to perform at least one of transmitting interim status updates at predetermined time intervals after commencement of the first transmission phase, transmitting a status update indicating that a selected percentage of the file has been received, transmitting interim status updates after different selected percentages of the file have been received, transmitting only an acknowledgement when file delivery is complete, and transmitting a request for missing file parts after a selected portion of the file has been received.

17. The system of claim 16, wherein the processing device is configured to instruct the targeted user devices when to send the communications based on the specified criteria.

18. The system of claim 17, wherein the processing device is configured to instruct the targeted user device regarding the criteria for the communications using at least one of in-band signaling during the first transmission phase, out-of-band signaling during the first transmission phase, and one-to-one communication with the targeted device via the second transmission system.

19. The method of claim 1, further comprising:
after determining insufficient acknowledgements of complete file delivery, adding additional one-way communication channels for transmission of a next set of files to the targeted user devices.

20. The method of claim 19, further comprising:
varying a transmission sequence of file parts of the plurality of file parts for each additional one-way communication path.

* * * * *